(12) United States Patent
Kirsch et al.

(10) Patent No.: US 7,135,210 B2
(45) Date of Patent: *Nov. 14, 2006

(54) LIQUID CRYSTAL COMPOUNDS

(75) Inventors: Peer Kirsch, Seeheim-Jugenheim (DE);
Detlef Pauluth, Ober-Ramstadt (DE);
Andreas Ruhl, Rossdorf (DE);
Joachim Krause, Dieburg (DE);
Kazuaki Tarumi, Seeheim-Jugenheim (DE); Michael Heckmeier, Hemsbach (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/492,834

(22) PCT Filed: Oct. 14, 2002

(86) PCT No.: PCT/EP02/11463

§ 371 (c)(1),
(2), (4) Date: Apr. 15, 2004

(87) PCT Pub. No.: WO03/033619

PCT Pub. Date: Apr. 24, 2003

(65) Prior Publication Data

US 2004/0238789 A1  Dec. 2, 2004

(30) Foreign Application Priority Data

Oct. 17, 2001 (DE) .................. 101 51 300

(51) Int. Cl.
*C09K 19/12* (2006.01)
*C09K 19/30* (2006.01)
*C09K 19/20* (2006.01)
*C07C 25/13* (2006.01)

(52) U.S. Cl. .......... 428/1.1; 252/299.01; 252/299.63; 252/299.66; 252/299.67; 570/127; 570/129; 570/131

(58) Field of Classification Search ................ 428/1.1; 252/299.01, 299.63, 299.66, 299.67; 570/127, 570/129, 131
See application file for complete search history.

(56) References Cited

U.S. PATENT DOCUMENTS 5,045,229 A  9/1991  Bartmann et al.
5,589,102 A  12/1996 Bartmann et al.
5,792,386 A   8/1998  Matsui et al.
6,315,922 B1 11/2001 Takeshita et al.
6,497,929 B1 12/2002 Miyairi et al.
6,500,502 B1 12/2002 Fujita et al.
6,630,210 B1 * 10/2003 Kirsch et al. ................ 428/1.1
6,962,733 B1 * 11/2005 Heckmeier et al. ........... 428/1.1
7,001,646 B1 *  2/2006 Heckmeier et al. ........... 428/1.1
2002/0028306 A1  3/2002 Kirsch et al.

FOREIGN PATENT DOCUMENTS

| DE | 19531165 | 3/1996 |
|---|---|---|
| DE | 10124480 | 1/2002 |
| DE | 10158081 | 8/2002 |
| EP | 0786445 | 7/1997 |
| EP | 1046694 | 10/2000 |
| EP | 1085073 | 3/2001 |
| EP | 1096001 | 5/2001 |
| EP | 1245660 | 10/2002 |
| GB | 2229438 | 9/1990 |
| WO | WO 0112751 | 2/2001 |
| WO | WO 0127221 | 4/2001 |
| WO | WO 0146336 | 6/2001 |

OTHER PUBLICATIONS

CAPLUS 1974: 504876.*
CAPLUS 1975: 43017.*
CAPLUS 1975: 496799.*
CAPLUS 1978: 190433.*
CAPLUS 1990: 76887.*
CAPLUS 1996: 527066.*

* cited by examiner

*Primary Examiner*—Shean C. Wu
(74) *Attorney, Agent, or Firm*—Millen, White, Zelano & Branigan, P.C.

(57) ABSTRACT

The invention relates to liquid crystal compounds of formula (I), where $X^1$, $X^2$, $X^3$, $Z^1$, $Z^2$, $L^1$, $L^2$, $L^3$, $L^4$, $L^5$, $L^6$, $L^7$, $L^8$, $L^9$, $L^{10}$, $L^{11}$ and a have the meanings given in claim 1, and liquid crystal media containing at least one compound of formula (I) and electro-optical displays comprising such a liquid crystal medium (I)

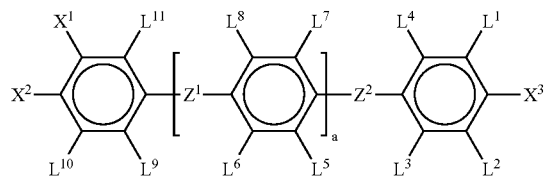

17 Claims, No Drawings

LIQUID CRYSTAL COMPOUNDS

The present invention relates to liquid-crystalline compounds and to a liquid-crystalline medium, to the use thereof for electro-optical purposes, and to displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Further-more, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical con-ductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Non-linear elements which can be used for individual switching of the individual pixels are, for example, active elements (i.e. transistors). The term "active matrix" is then used, where a distinction can be made between two types:
1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joins.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are illuminated from the back.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket television sets) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 if, Paris; STROMER, M., Proc. Eurodisplay84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not meet today's requirements.

There thus continues to be a great demand for MLC displays having very high specific resistance at the same time as a large working-temperature range, short response times even at low temperatures and low threshold voltage which do not have these disadvantages, or only do so to a reduced extent.

In TN (Schadt-Helfrich) cells, media are desired which facilitate the following advantages in the cells:
 extended nematic phase range (in particular down to low temperatures)
 the ability to switch at extremely low temperatures (outdoor use, auto-mobile, avionics)
 increased resistance to UV radiation (longer service life)
 high $\Delta n$ for faster response times The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

The invention has the object of providing media, in particular for MLC, IPS, TN or STN displays of this type, which do not have the above-mentioned disadvantages or only do so to a reduced extent, and preferably simultaneously have very high specific resistance values and low threshold voltages. This object requires liquid-crystalline compounds which have a high clearing point and low rotational viscosity.

It has now been found that this object can be achieved if the liquid-crystalline compounds according to the invention are used.

The invention thus relates to liquid-crystalline compounds of the formula I

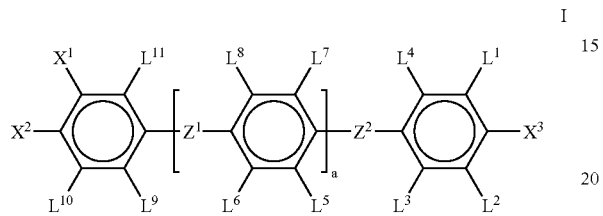

in which

| | |
|---|---|
| $X^1$ and $X^2$ | are each, independently of one another, F, Cl, Br or I, or one of the radicals $X^1$ and $X^2$ is alternatively H, |
| $X^3$ | is F, Cl, CN, NCS, $SF_5$, or a halogenated alkyl, alkoxy, alkenyl or alkenyloxy radical having up to 5 carbon atoms, |
| $Z^1$ and $Z^2$ | are each, independently of one another, —CO—O—, —O—CO—, —$CF_2O$—, —$OCF_2$—, —$CH_2O$—, —$OCH_2$—, —$CH_2CH_2$—, —$(CH_2)_4$—, —$C_2F_4$—, —$CH_2CF_2$—, —$CF_2CH_2$—, —CF=CF—, —CH=CH—, —C≡C— or a single bond, with the proviso that at least one of the bridges $Z^1$ and $Z^2$ is —$CF_2O$— or —$OCF_2$—, |
| a | is 0, 1 or 2, and |
| $L^1$ to $L^{11}$ | are each, independently of one another, H or F. |

The invention furthermore relates to the use of the compounds of the formula I in liquid-crystalline media, as synthetic building blocks, for example for liquid crystals, crop-protection agents and pharmaceuticals. Particular preference is given to compounds where $X^1$ and/or $X^2$=Cl, Br or I, in particular where Br and I.

The compounds of the formula I have a broad range of applications. Depending on the choice of substituents, these compounds can serve as base materials of which liquid-crystalline media are predominantly composed; however, it is also possible to add compounds of the formula I to liquid-crystalline base materials from other classes of compound in order, for example, to modify the dielectric and/or optical anisotropy of a dielectric of this type and/or in order to optimise its threshold voltage and/or its viscosity.

In the pure state, the compounds of the formula I are colourless and form liquid-crystalline mesophases in a temperature range which is favourably located for electro-optical use. In particular, the compounds according to the invention are distinguished by their broad nematic phase range. In liquid-crystalline mixtures, the substances according to the invention suppress the smectic phases and result in a significant improvement in the low-temperature storage stability. They are stable chemically, thermally and to light.

The invention relates, in particular, to the compounds of the formula I in which $X^1$ is F or Cl, $X^2$=H and $X^3$=F or $OCF_3$.

Particular preference is given to compounds of the formula I in which a=1, furthermore a=2. $Z^1$ or $Z^2$ is preferably a single bond, furthermore —$CF_2O$—, —$OCF_2$—, —$C_2F_4$—, —$CH_2O$—, —$OCH_2$— or —COO—.

$L^1$ is preferably F and $L^2$ is preferably H or F. $L^1$ and $L^2$ are particularly preferably fluorine. Preference is furthermore given to compounds in which $L^2$ and $L^3$ are fluorine.

Particularly preferred compounds of the formula I are the compounds I1 to I120:

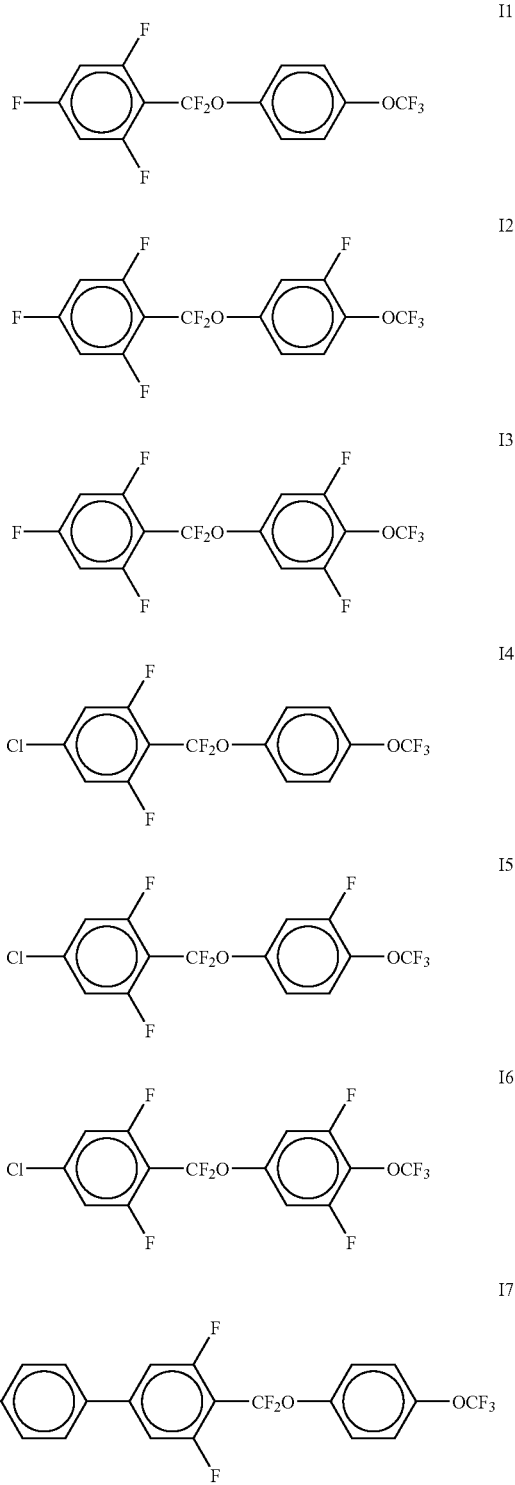

-continued
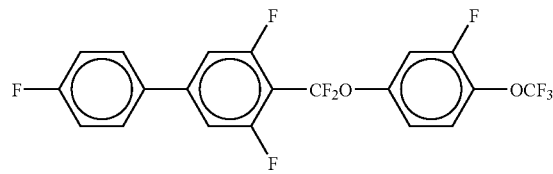
I8
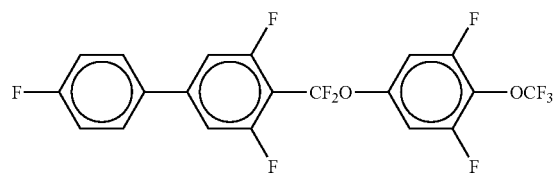
I9
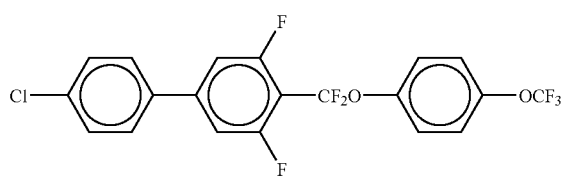
I10
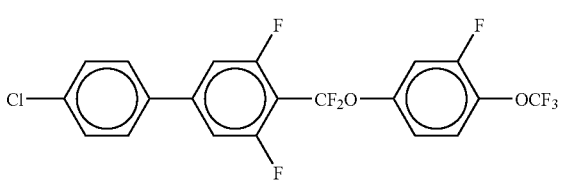
I11
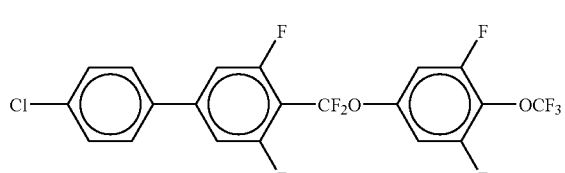
I12
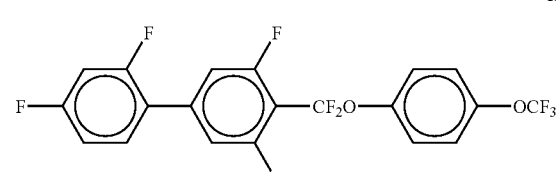
I13
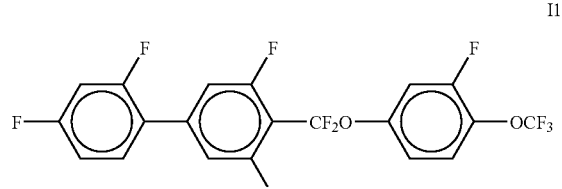
I14
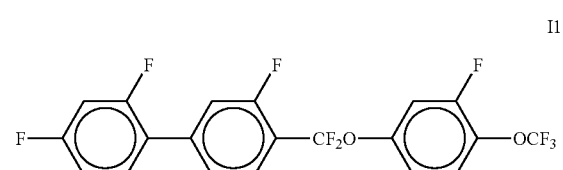
I15
-continued
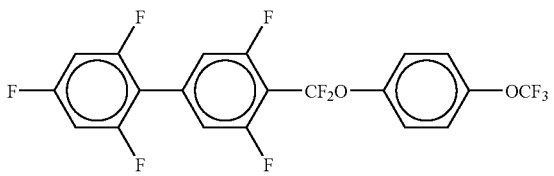
I16
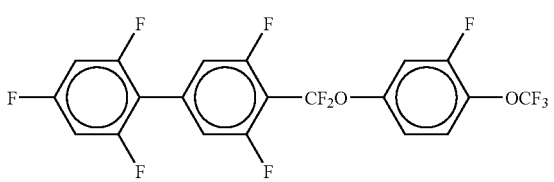
I17
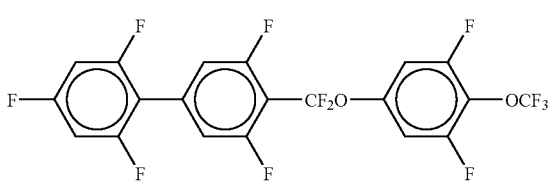
I18
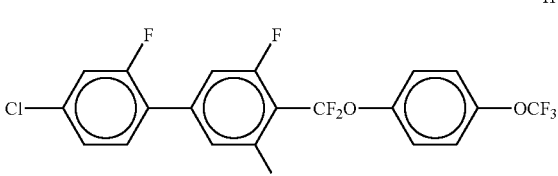
I19
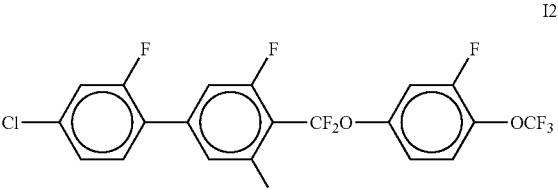
I20
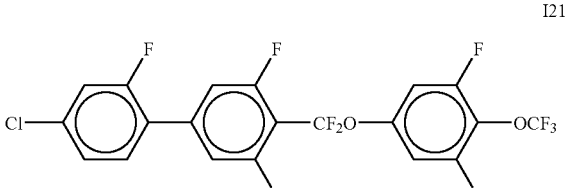
I21
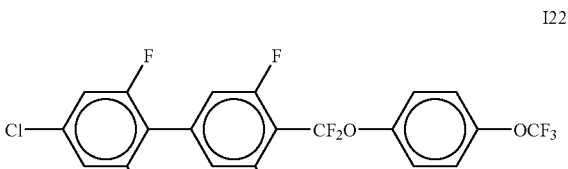
I22
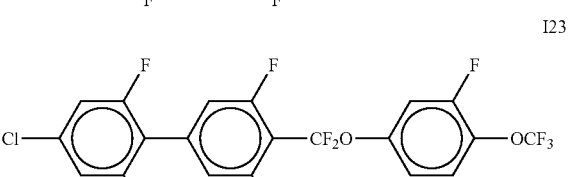
I23

-continued

I40 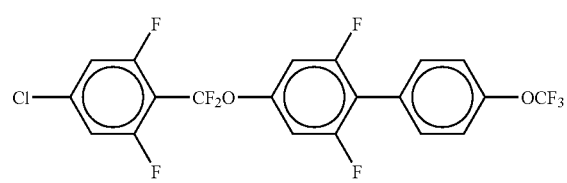
I41 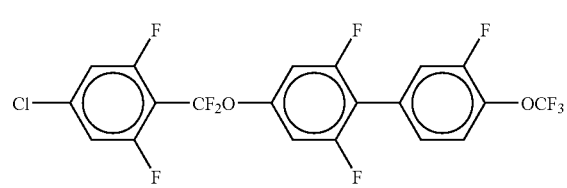
I42 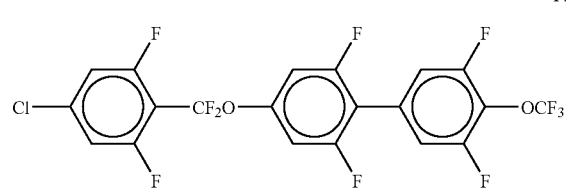
I43 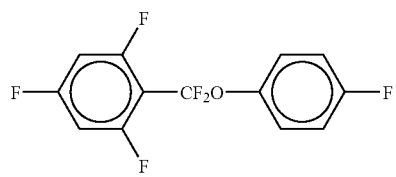
I44 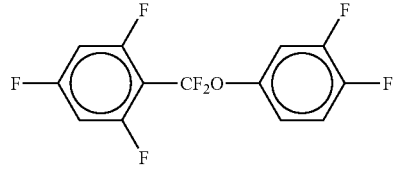
I45 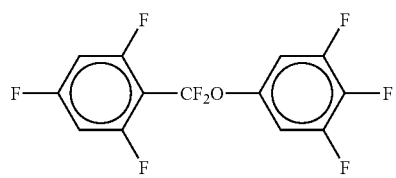
I46 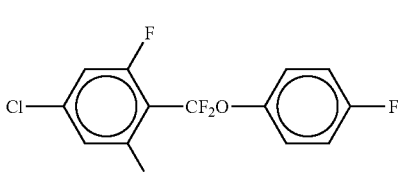
I47 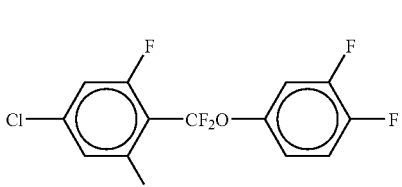
I48 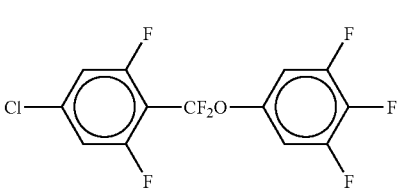
I49 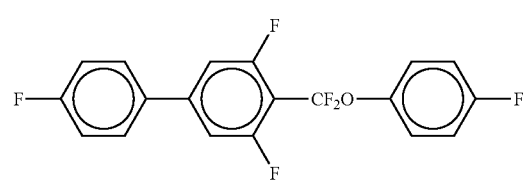
I50 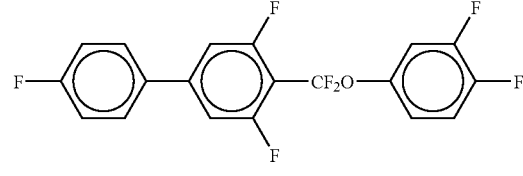
I51 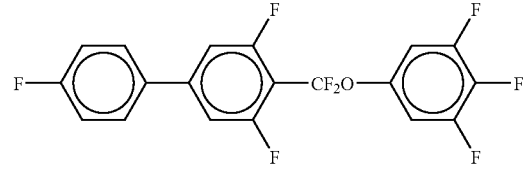
I52 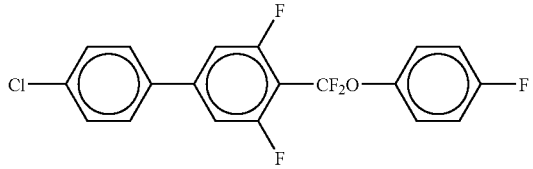
I53 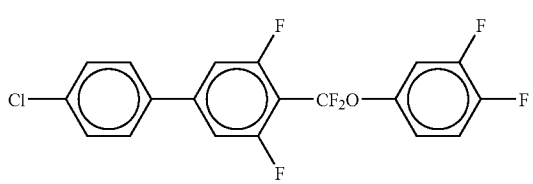
I54 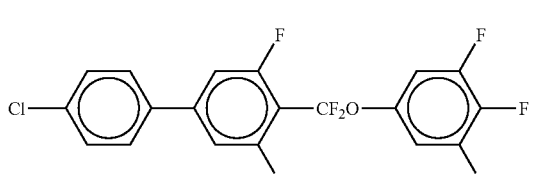
I55 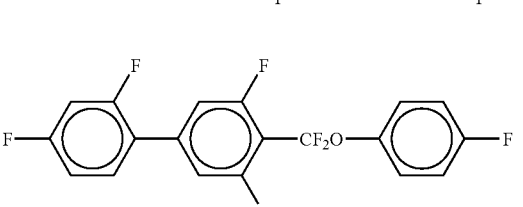

-continued
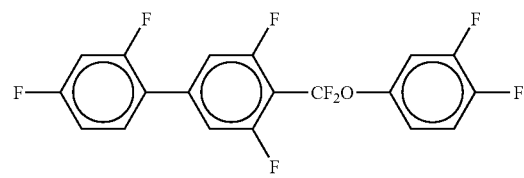
I56
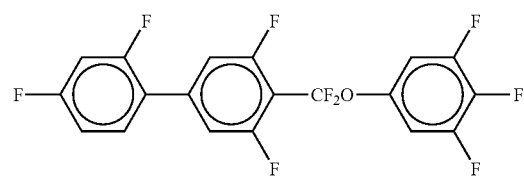
I57
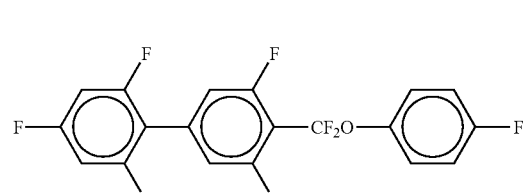
I58
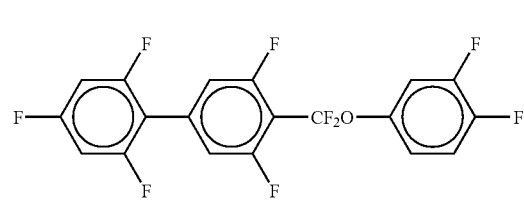
I59
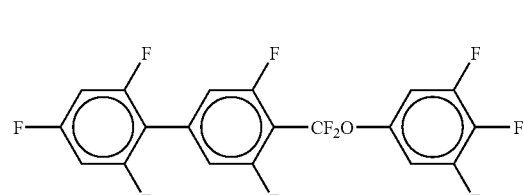
I60
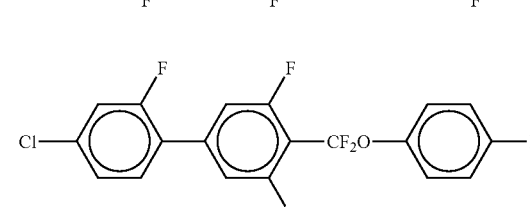
I61
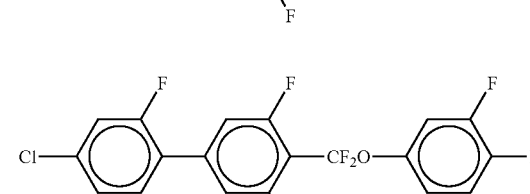
I62
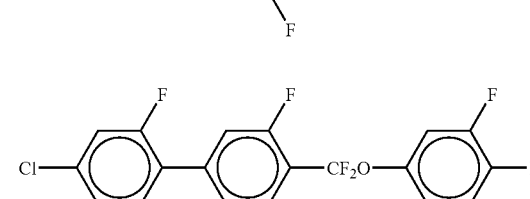
I63
-continued
I64
I65
I66
I67
I68
I69
I70
I71

-continued

-continued

-continued

-continued

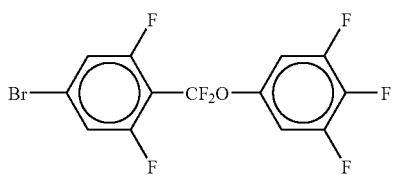
I120

The compounds of the formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.

The compounds according to the invention can be prepared, for example, as follows:

Scheme 1

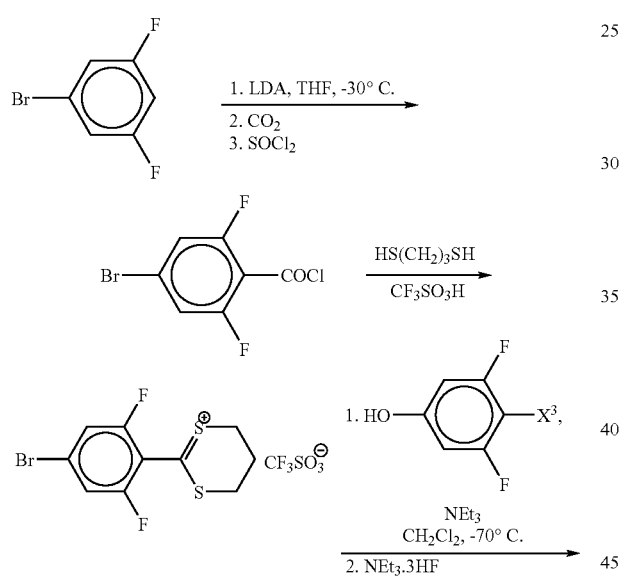

-continued

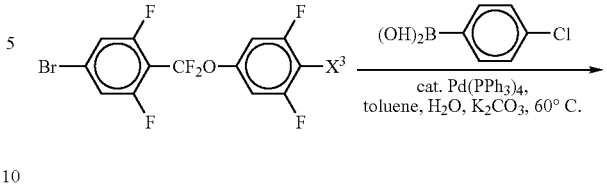

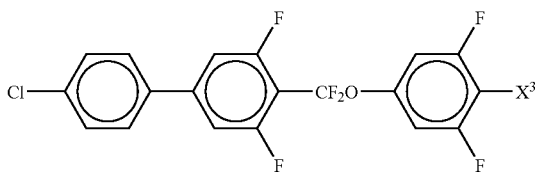

Scheme 2

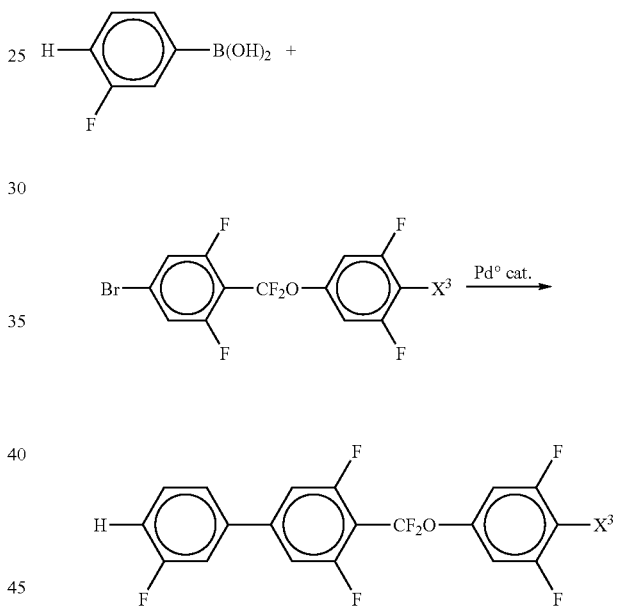

Scheme 3

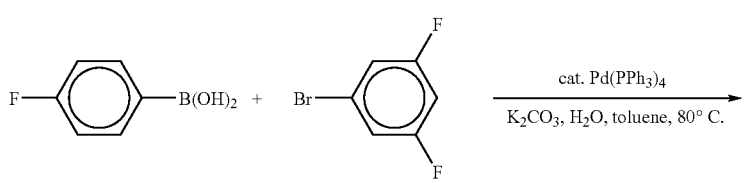

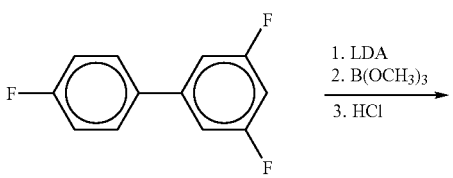

-continued

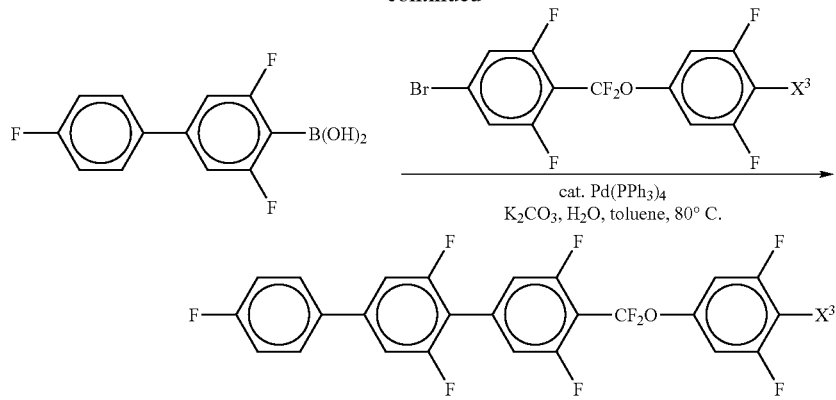

The compounds according to the invention are also suitable as synthetic building blocks for liquid crystals, as can be seen, for example, from Scheme 4.

The liquid-crystal mixtures according to the invention enable a significant widening of the available parameter latitude.

Scheme 4

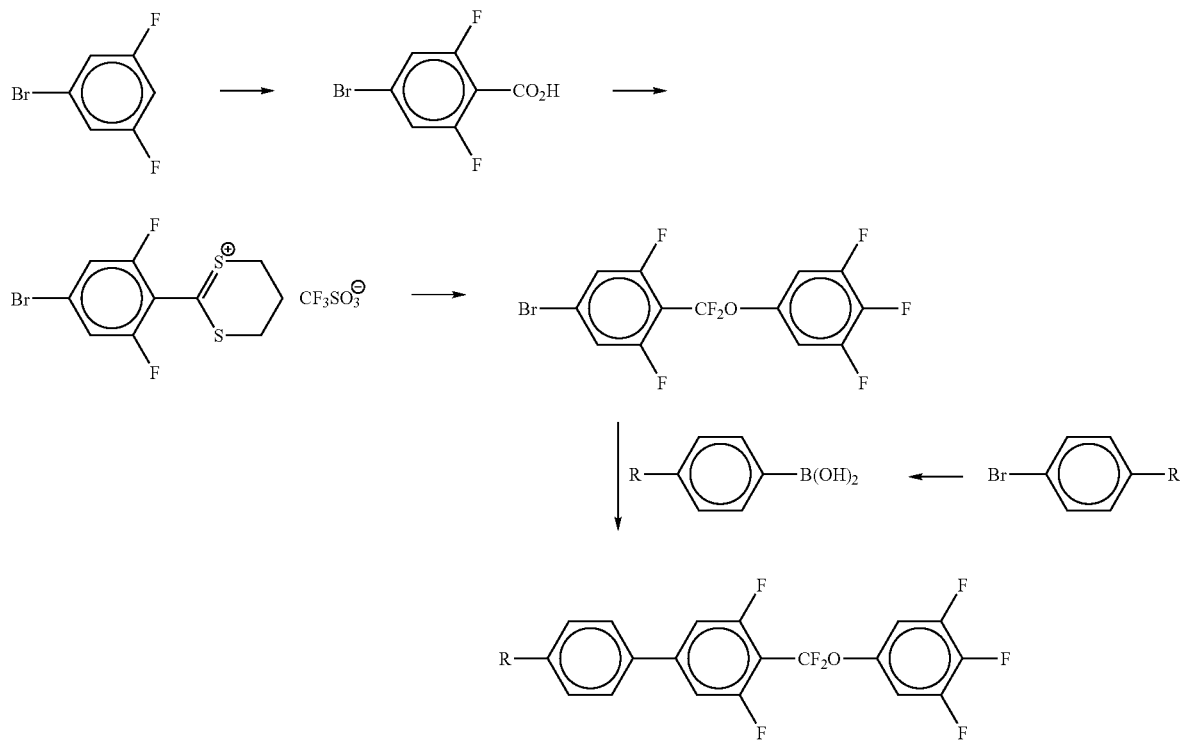

R = alkyl, alkenyl or alkoxy having 1–12 carbon atoms

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell) which contain media of this type, and to the use of these media for electro-optical purposes.

The achievable combinations of clearing point, viscosity at low temperature, thermal and UV stability and dielectric anisotropy are far superior to previous materials from the prior art.

The requirement for a high clearing point, a nematic phase at low temperature and a high $\Delta\epsilon$ has hitherto only been satisfied to an inadequate extent. Although liquid-crystal mixtures such as, for example, MLC-6476 and MLC-6625 (Merck KGaA, Darmstadt, Germany) have comparable clearing points and low-temperature stabilities, they have, however, relatively high Δn values and also higher threshold voltages of about ≧1.7 V.

Other mixture systems have comparable viscosities and Δε values, but only have clearing points in the region of 60° C.

The liquid-crystal mixtures according to the invention, while retaining the nematic phase down to −20° C. and preferably down to −30° C., particularly preferably down to −40° C., enable clearing points above 80°, preferably above 90°, particularly preferably above 100° C., simultaneously dielectric anisotropy values Δε of ≧4, preferably ≧6, and a high value for the specific resistance to be achieved, enabling excellent STN and MLC displays to be obtained. In particular, the mixtures are characterised by low operating voltages. The TN thresholds are below 1.5 V, preferably below 1.3 V.

It goes without saying that, through a suitable choice of the components of the mixtures according to the invention, it is also possible for higher clearing points (for example above 110°) to be achieved at a higher threshold voltage or lower clearing points to be achieved at lower threshold voltages with retention of the other advantageous properties. At viscosities correspondingly increased only slightly, it is likewise possible to obtain mixtures having greater Δε and thus lower thresholds. The MLC displays according to the invention preferably operate at the first Gooch and Tarry transmission minimum [C. H. Gooch and H. A. Tarry, Electron. Lett. 10, 2–4, 1974; C. H. Gooch and H. A. Tarry, Appl. Phys., Vol. 8, 1575–1584,1975], where, besides particularly favourable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The flow viscosity $v_{20}$ at 20° C. is preferably <60 mm$^2$·s$^{-1}$, particularly preferably <50 mm$^2$·s$^{-1}$. The nematic phase range is preferably at least 90°, in particular at least 100°. This range preferably extends at least from −30° to +80°.

Measurements of the capacity holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR with increasing temperature than analogous mixtures comprising cyanophenylcyclohexanes of the formula

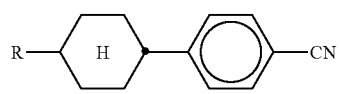

or esters of the formula

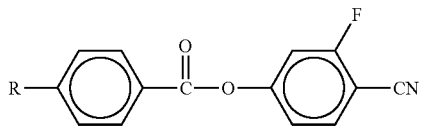

instead of the compounds of the formula I.

The UV stability of the mixtures according to the invention is also considerably better, i.e. they exhibit a significantly smaller decrease in the HR on exposure to UV.

The media according to the invention are preferably based on a plurality of (preferably two, three or more) compounds of the formula 1, i.e. the proportion of these compounds is 5–95%, preferably 10–60% and particularly preferably in the range 15–40%.

The individual compounds of the formulae I to IX and their sub-formulae which can be used in the media according to the invention are either known or they can be prepared analogously to the known compounds.

Preferred embodiments are indicated below:

The medium preferably comprises one, two or three homologous compounds of the formula I, where each homologue is present in the mixture up to a maximum amount of 10%.

Medium additionally comprises one or more compounds selected from the group consisting of the general formulae II to IX:

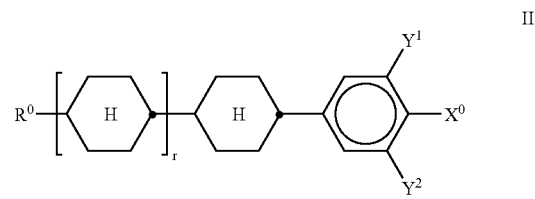

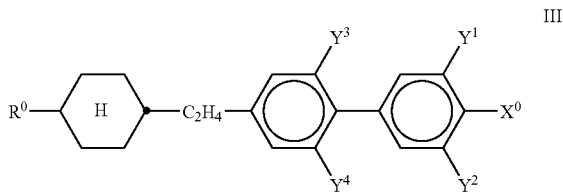

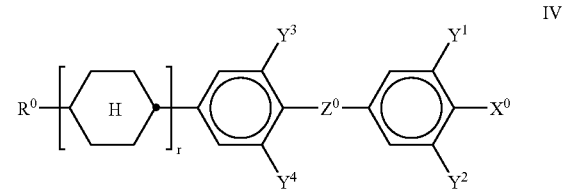

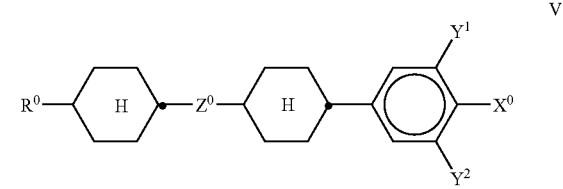

-continued

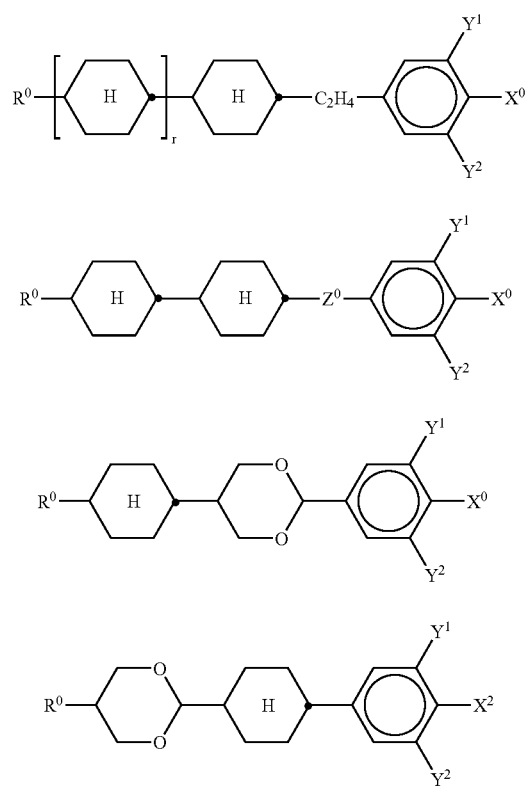

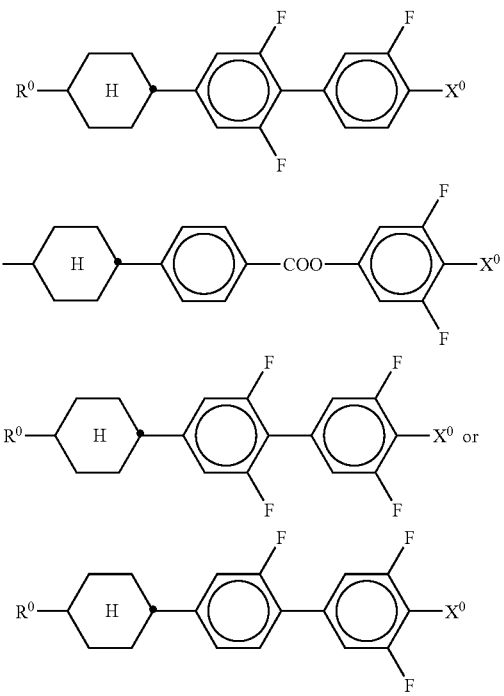

in which the individual radicals have the following meanings:

| | |
|---|---|
| $R^0$ | H, n-alkyl, oxaalkyl, fluoroalkyl, alkenyloxy or alkenyl, each having up to 9 carbon atoms, |
| $X^0$ | F, Cl, halogenated alkyl, halogenated alkenyl, halogenated alkenyloxy or halogenated alkoxy having up to 7 carbon atoms, |
| $Z^0$ | —CH=CH—, —C$_2$H$_4$—, —(CH$_2$)$_4$—, —C$_2$F$_4$—, —CH$_2$O—, —OCH$_2$—, —CF=CF—, —CF$_2$O—, —OCF$_2$— or —COO—, |
| $Y^1$, $Y^2$, $Y^3$ and $Y^4$ | each, independently of one another, H or F, and |
| r | 0 or 1. |

The compound of the formula IV is preferably

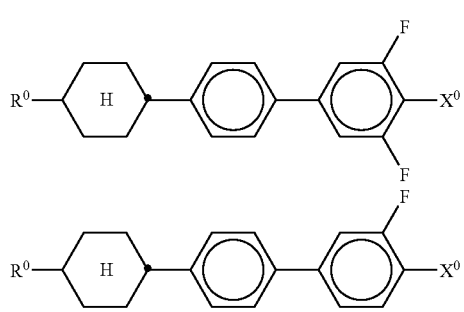

The medium preferably comprises one or more compounds of the formulae

-continued
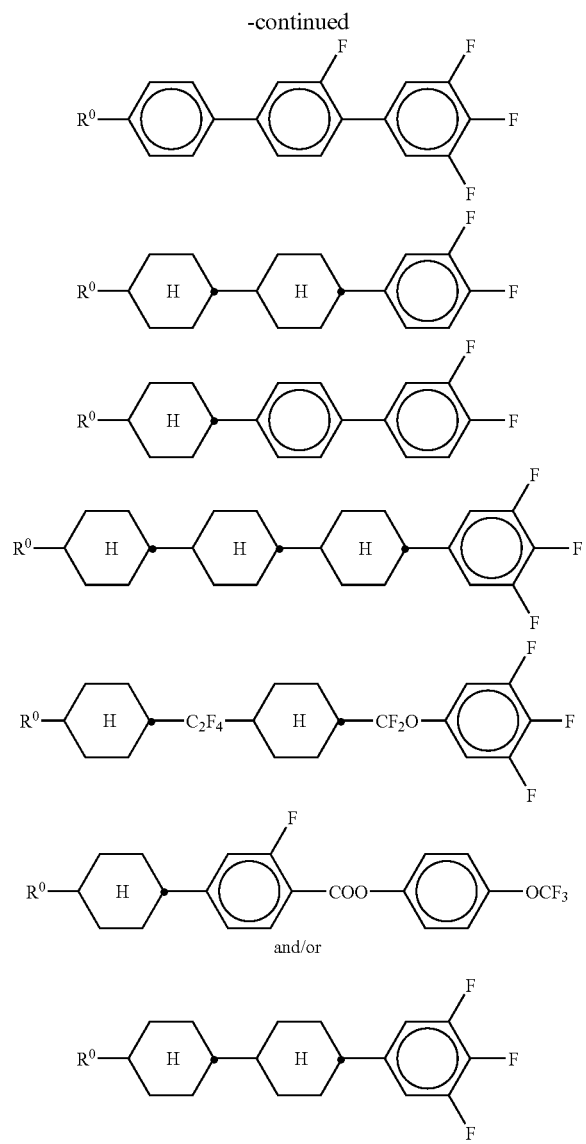
in which $R^0$ and $Y^2$ are as defined above.
The medium preferably comprises one, two or three, furthermore four, homologues of the compounds selected from the group consisting of H1 to H18 (n=1–7):
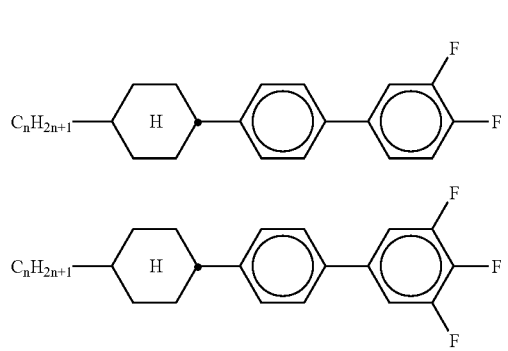
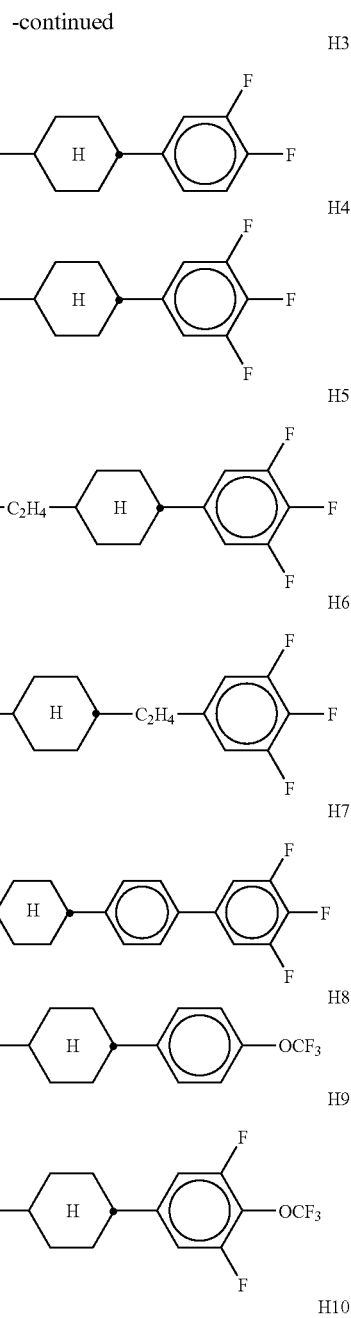
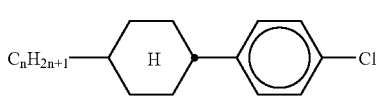

-continued

H13
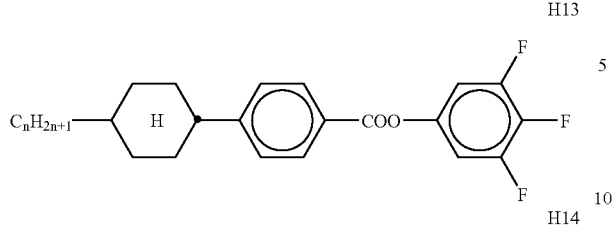

H14
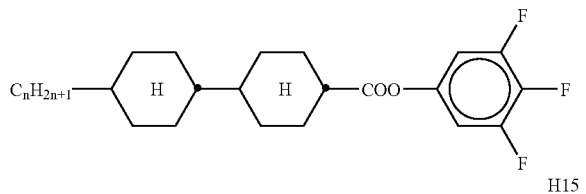

H15
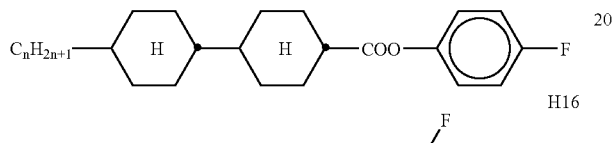

H16
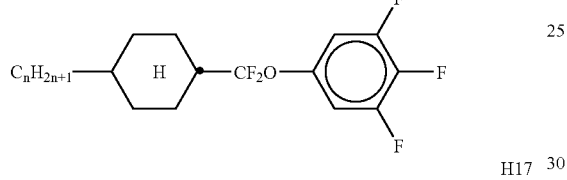

H17
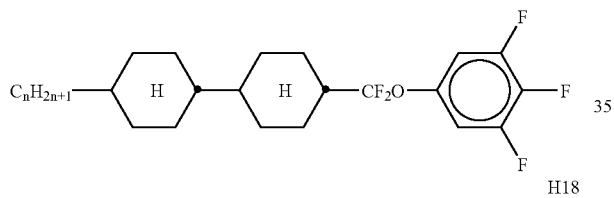

H18
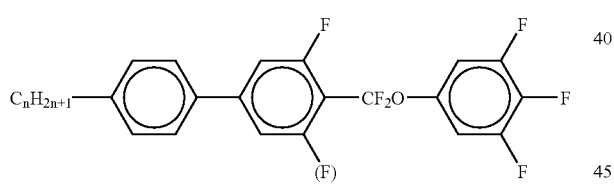

The medium additionally comprises one or more compounds selected from the group consisting of the general formulae X to XV:

X
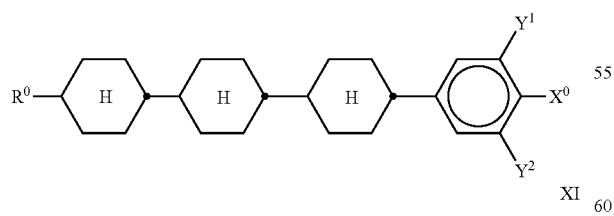

XI
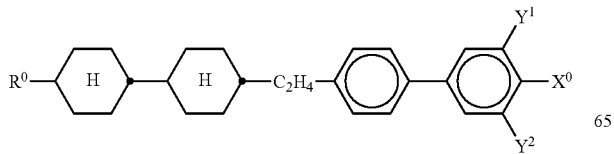

-continued

XII
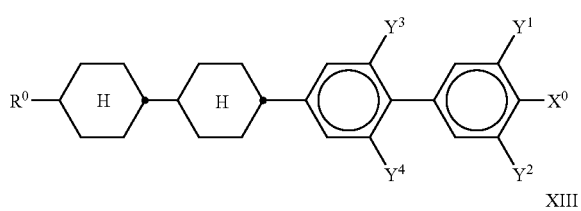

XIII
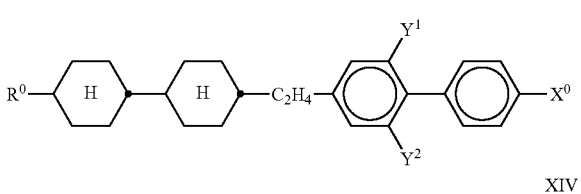

XIV
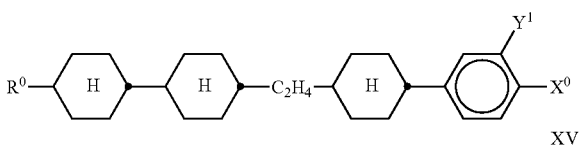

XV
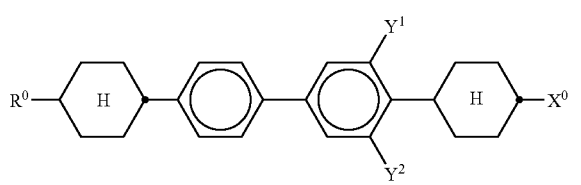

in which $R^0$, $X^0$, $Y^1$, $Y^2$, $Y^3$ and $Y^4$ each, independently of one another, have one of the meanings indicated in claim 7. $X^0$ is preferably F, Cl, $CF_3$, $OCF_3$ or $OCHF_2$. $R^0$ is preferably H, alkyl, oxaalkyl, fluoroalkyl, alkenyl or alkenyloxy.

The proportion of compounds of the formulae I to IX together in the mixture as a whole is at least 50% by weight.

The proportion of compounds of the formula I in the mixture as a whole is from 5 to 50% by weight.

The proportion of compounds of the formulae II to IX in the mixture as a whole is from 30 to 70% by weight.

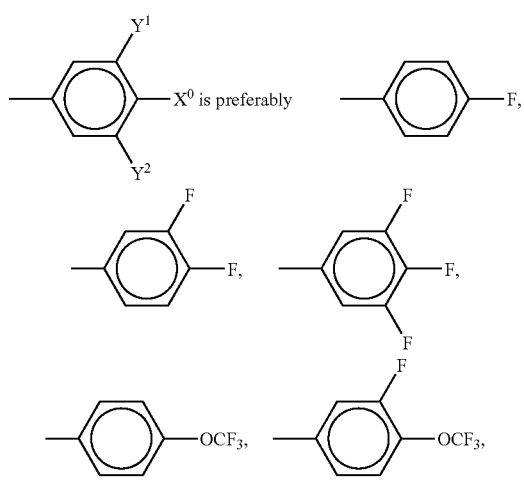

in which $R^0$ and $X^0$ are as defined above, and the 1,4-phenylene rings may be substituted by CN, chlorine or fluorine. The 1,4-phenylene rings are preferably mono- or polysubstituted by fluorine atoms.

The medium comprises further compounds, preferably selected from the following group consisting of the formulae RI to RIX The medium comprises compounds of the formulae II, III, IV, V, VI, VII, VIII and/or IX.

$R^0$ is straight-chain alkyl or alkenyl having from 2 to 7 carbon atoms.

The medium essentially consists of compounds of the formulae I to XV.

The medium comprises further compounds, preferably selected from the following group consisting of the general formulae XVI to XX:

-continued

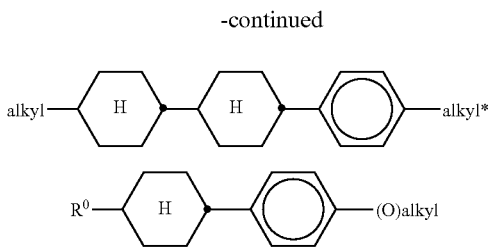

in which

| $R^0$ | is n-alkyl, oxaalkyl, fluoroalkyl, alkenyloxy or alkenyl, each having up to 9 carbon atoms, |
|---|---|
| d | is 0, 1 or 2, |
| $Y^1$ | is H or F, |
| alkyl and alkyl* | are each, independently of one another, a straight-chain or branched alkyl radical having 1–9 carbon atoms, |
| alkenyl and alkenyl* | are each, independently of one another, a straight-chain or branched alkenyl radical having up to 9 carbon atoms. |

The medium preferably comprises one or more compounds of the formulae

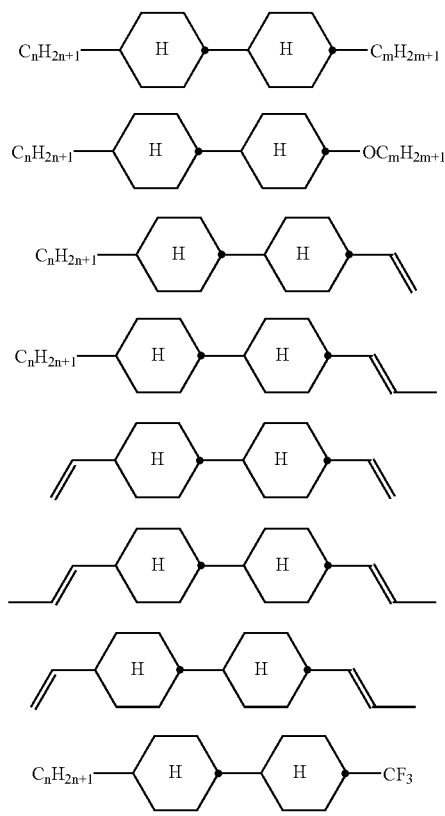

in which n and m are each an integer from 1 to 9.

The I: (II+III+IV+V+VI+VII+VIII+IX) weight ratio is preferably from 1:10 to 10:1.

The medium essentially consists of compounds selected from the group consisting of the general formulae I to XV.

It has been found that even a relatively small proportion of compounds of the formula I mixed with conventional liquid-crystal materials, but in particular with one or more compounds of the formulae II, III, IV, V, VI, VII, VIII or IX, results in a considerable lowering of the threshold voltage and in low birefringence values, with broad nematic phases with low smectic-nematic transition temperatures being observed at the same time, improving the storage stability. The compounds of the formulae I to IX are colourless, stable and readily miscible with one another and with other liquid-crystal materials.

The term "alkyl" or "alkyl*" covers straight-chain and branched alkyl groups having 1–9 carbon atoms, in particular the straight-chain groups methyl, ethyl, propyl, butyl, pentyl, hexyl and heptyl. Groups having 2–5 carbon atoms are generally preferred.

The term "alkenyl" or "alkenyl*" covers straight-chain and branched alkenyl groups having up to 9 carbon atoms, in particular the straight-chain groups. Particularly preferred alkenyl groups are $C_2$–$C_7$-1E-alkenyl, $C_4$–$C_7$-3E-alkenyl, $C_5$–$C_{7-4}$-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. Preferably, n=1 and m is from 1 to 6.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl or alkoxy radicals. 4-Alkenyl radicals, 3-alkenyl radicals and the like generally give lower threshold voltages and smaller values of $k_{33}/k_{11}$ compared with alkyl and alkoxy radicals.

A —$CH_2CH_2$— group in $Z^1$ and/or $Z^2$ generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades and faster response times) and steeper transmission characteristic lines in STN, SBE and OMI cells (greater multiplexability), and vice versa.

The optimum mixing ratio of the compounds of the formulae I and II+III+IV+V+VI+VII+VIII+IX depends substantially on the desired properties, on the choice of the components of the formulae I, II, III, IV, V, VI, VII, VIII and/or IX, and on the choice of any further components that may be present. Suitable mixing ratios within the range given above can easily be determined from case to case.

The total amount of compounds of the formulae I to XV in the mixtures according to the invention is not crucial. The mixtures can therefore comprise one or more further components for the purposes of optimisation of various properties. However, the observed effect on the addressing times and the threshold voltage is generally greater, the higher the total concentration of compounds of the formulae I to XV.

In a particularly preferred embodiment, the media according to the invention comprise compounds of the formulae II to IX (preferably II and/or III) in which $X^0$ is $OCF_3$, $OCHF_2$, F, $OCH=CF_2$, $OCF=CF_2$, $OCF_2CHFCF_3$ or $OCF_2—CF_2H$. A favourable synergistic effect with the compounds of the formula I results in particularly advantageous properties.

The construction of the MLC display according to the invention from polarisers, electrode base plates and surface-treated electrodes corresponds to the conventional construction for displays of this type. The term conventional construction is broadly drawn here and also covers all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, stabilisers and antioxidants. For example, 0–15% of pleochroic dyes or chiral dopants can be added.

C denotes a crystalline phase, S a smectic phase, $S_C$ a smectic C phase, $S_B$ a smectic B phase, N a nematic phase and I the isotropic phase.

$V_{10}$ denotes the voltage for 10% transmission (viewing angle perpendicular to the plate surface). $t_{on}$ denotes the switch-on time and $t_{off}$ the switch-off time at an operating voltage corresponding to 2 times the value of $V_{10}$. $\Delta n$ denotes the optical anisotropy and $n_o$ the refractive index. $\Delta\epsilon$ denotes the dielectric anisotropy ($\Delta\epsilon=\epsilon_\parallel-\epsilon_\perp$, where $\epsilon_\parallel$ denotes the dielectric constant parallel to the longitudinal molecular axes and $\epsilon_\perp$ the dielectric constant perpendicular thereto). The electro-optical data were measured in a TN cell at the 1 st minimum (i.e. at a d·$\Delta n$ value of 0.5) at 20° C., unless expressly stated otherwise. The optical data were measured at 20° C., unless expressly stated otherwise.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. n and m are each, independently of one another, 1, 2, 3, 4, 5, 6, 7, 8, 9, 10, 11, 12, 13, 14 or 15. The coding in Table B is self-evident. In Table A, only the acronym for the parent structure is indicated. In individual cases, the acronym for the parent structure is followed, separated by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| $nCF_3$ | $C_nH_{2n+1}$ | $CF_3$ | H | H |
| $nOCF_3$ | $C_nH_{2n+1}$ | $OCF_3$ | H | H |
| $nOCF_2$ | $C_nH_{2n+1}$ | $OCHF_2$ | H | H |
| nS | $C_nH_{2n+1}$ | NCS | H | H |
| rVsN | $C_rH_{2r+1}—CH=CH—C_sH_{2s}—$ | CN | H | H |
| rEsN | $C_rH_{2r+1}—O—C_2H_{2s}—$ | CN | H | H |
| nAm | $C_nH_{2n+1}$ | $COOC_mH_{2m+1}$ | H | H |
| $nOCCF_2.F.F$ | $C_nH_{2n+1}$ | $OCH_2CF_2H$ | F | F |

Preferred mixture components are given in Tables A and B.

TABLE A

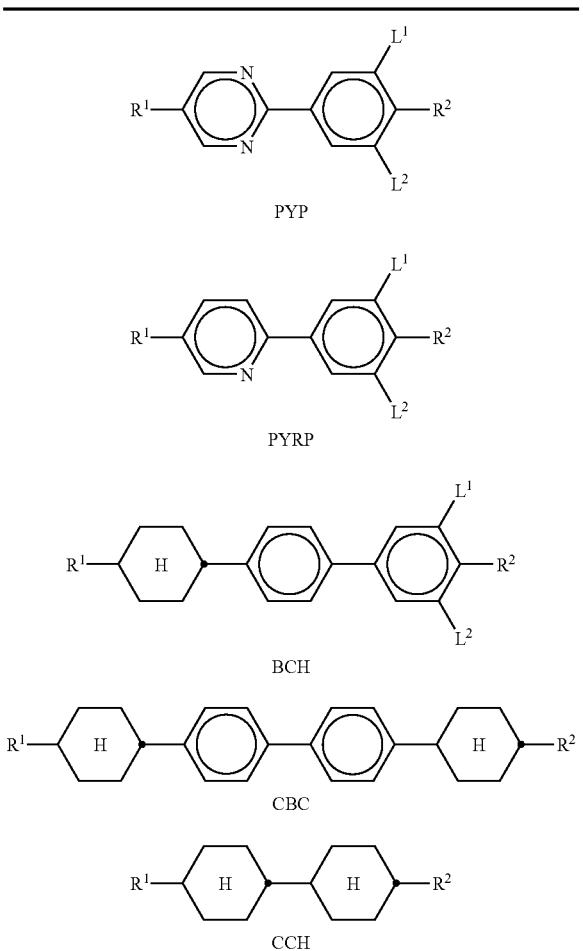

PYP

PYRP

BCH

CBC

CCH

TABLE A-continued
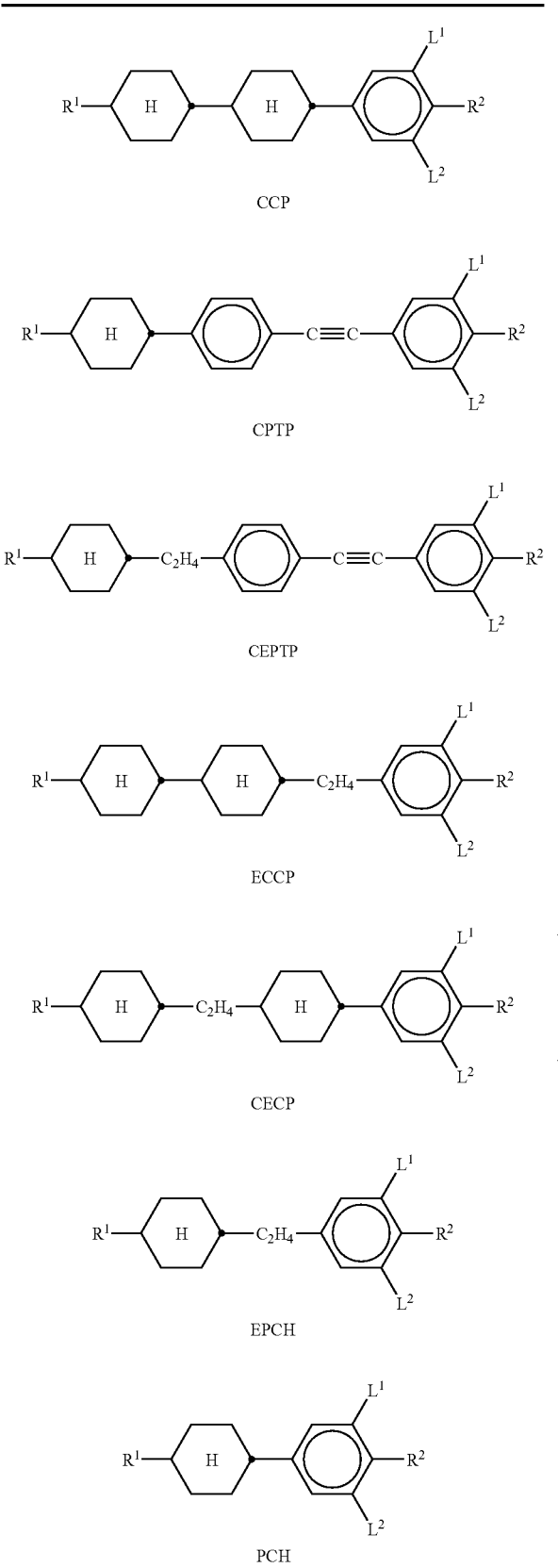
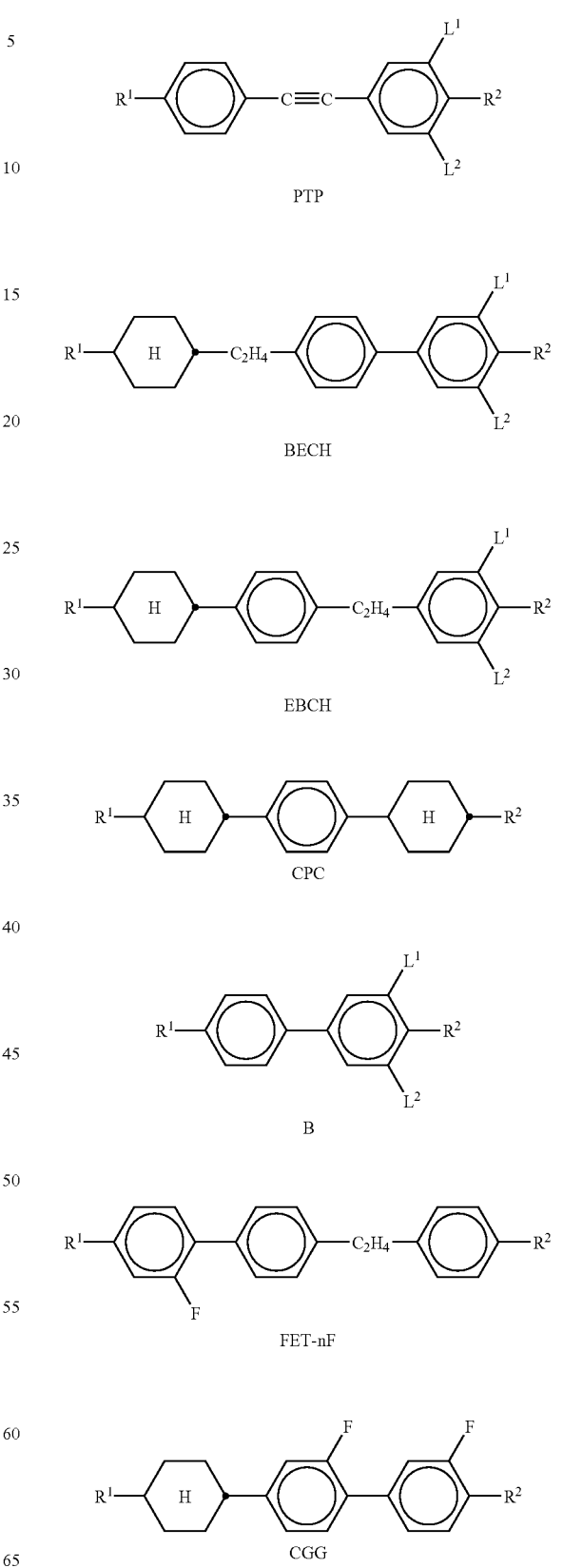

TABLE A-continued
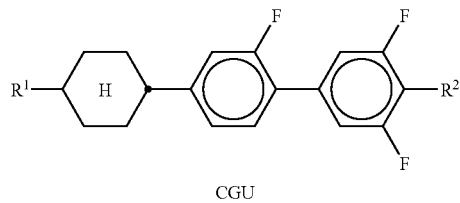
CGU
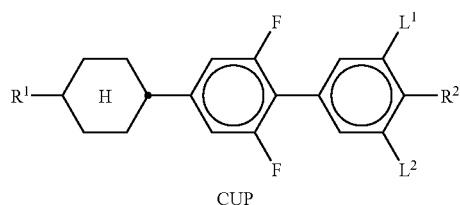
CUP
TABLE A-continued
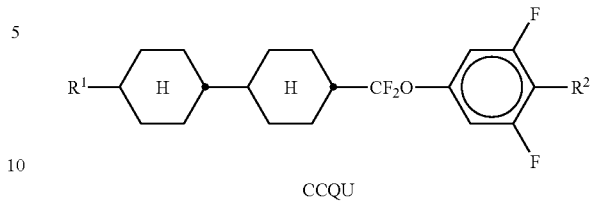
CCQU
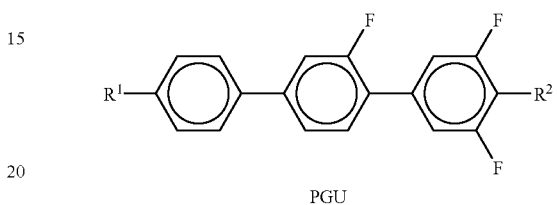
PGU
TABLE B
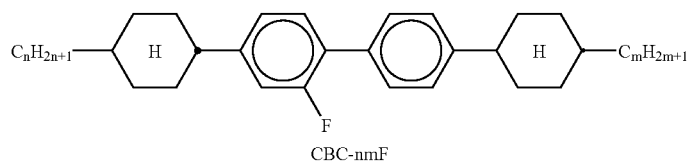
CBC-nmF
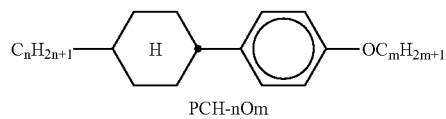
PCH-nOm
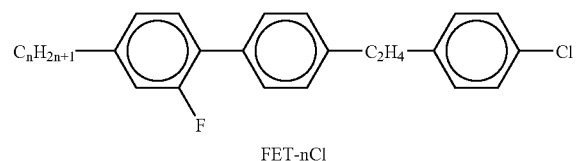
FET-nCl
CP-nOCF3
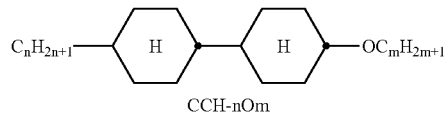
CCH-nOm
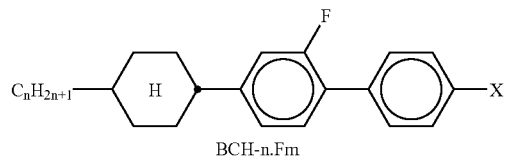
BCH-n.Fm TABLE B-continued
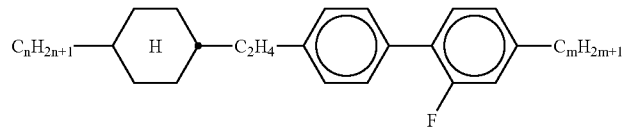
Inm
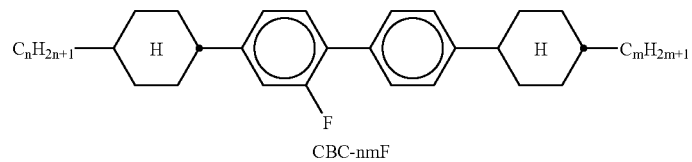
CBC-nmF
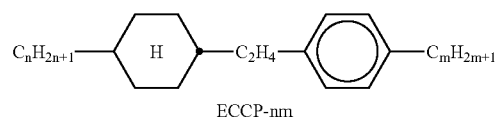
ECCP-nm
CCH-n1EM
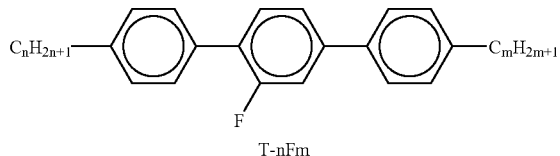
T-nFm
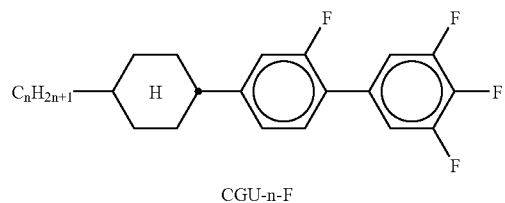
CGU-n-F
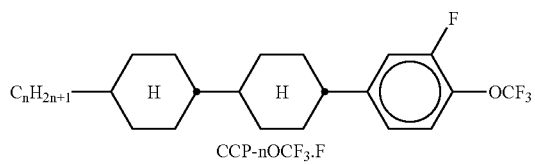
CCP-nOCF$_3$.F
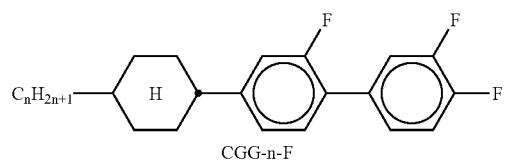
CGG-n-F
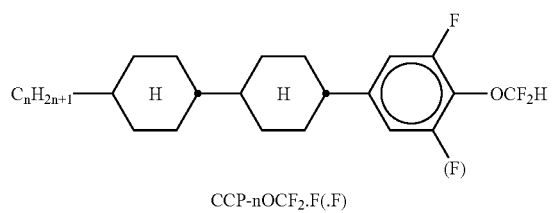
CCP-nOCF$_2$.F(.F)

TABLE B-continued
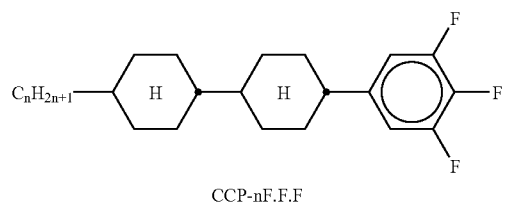
CCP-nF.F.F
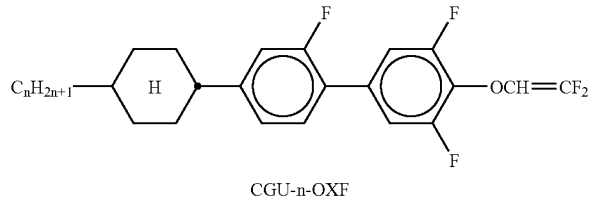
CGU-n-OXF
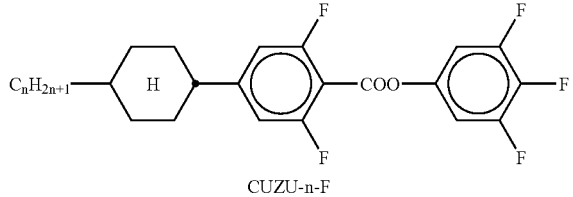
CUZU-n-F
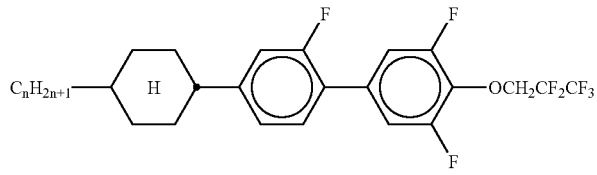
CGU-n-O1DT
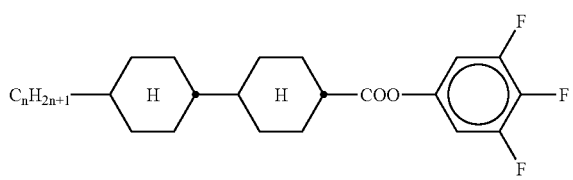
CCZU-n-F
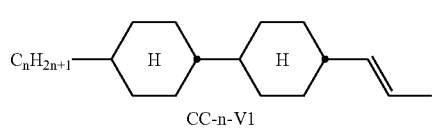
CC-n-V1
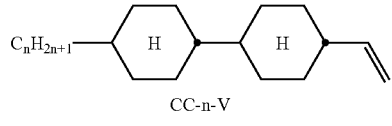
CC-n-V
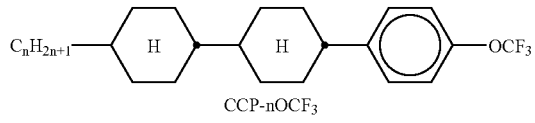
CCP-nOCF$_3$ TABLE B-continued
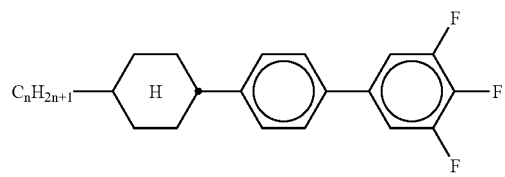
BCH-nF.F.F
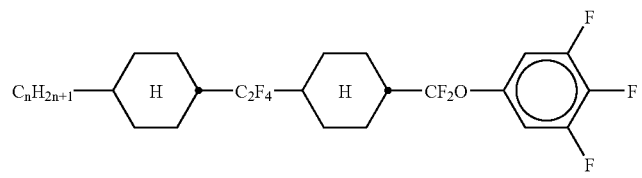
CWCQU-n-F
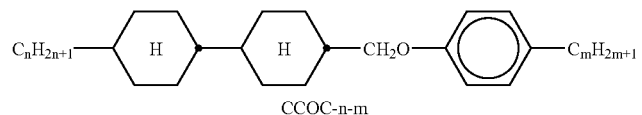
CCOC-n-m
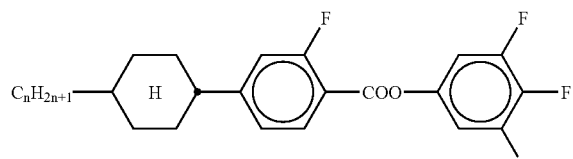
CGZU-n-F
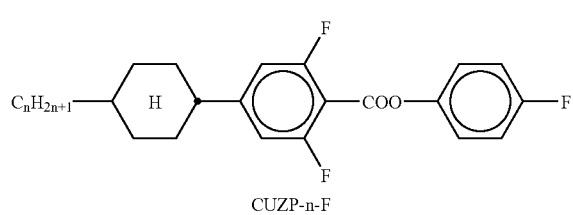
CUZP-n-F
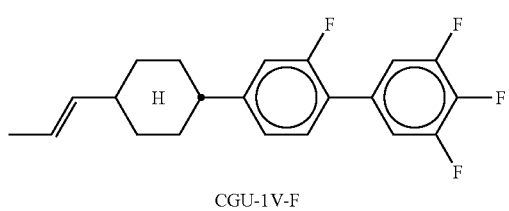
CGU-1V-F
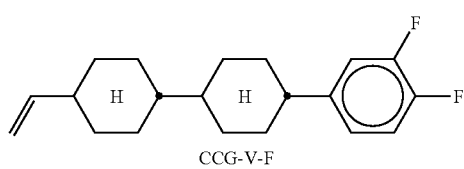
CCG-V-F
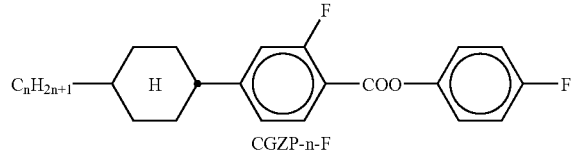
CGZP-n-F TABLE B-continued
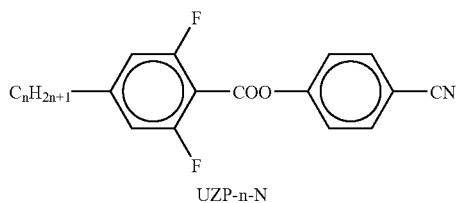
UZP-n-N
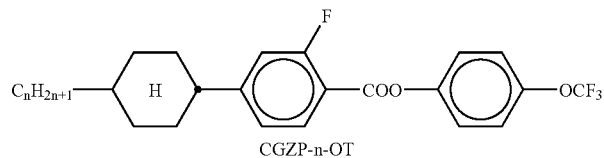
CGZP-n-OT
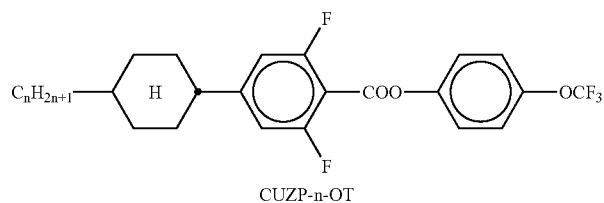
CUZP-n-OT
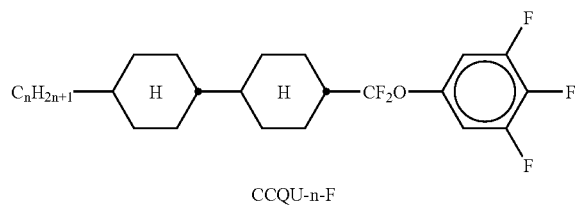
CCQU-n-F
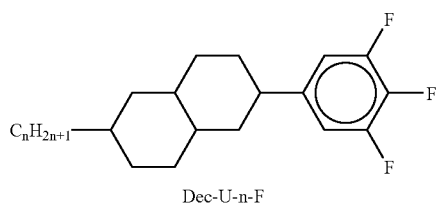
Dec-U-n-F
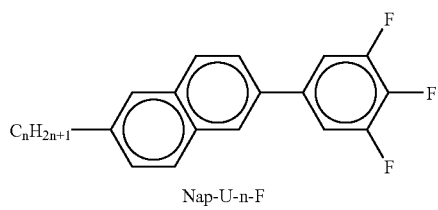
Nap-U-n-F
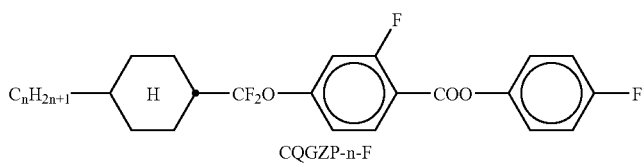
CQGZP-n-F
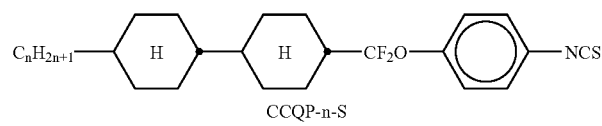
CCQP-n-S TABLE B-continued
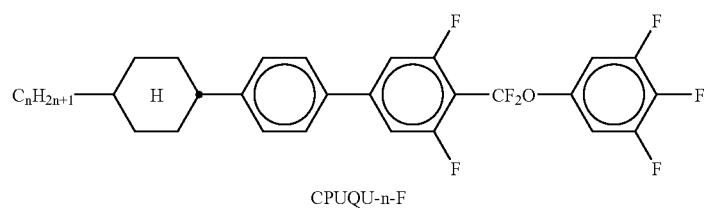
CPUQU-n-F
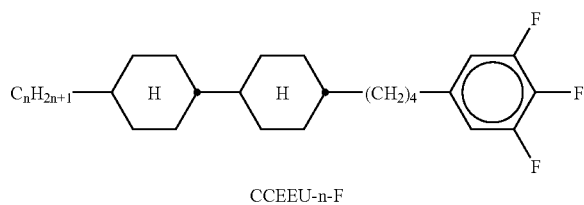
CCEEU-n-F
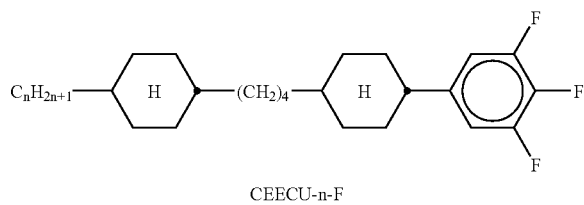
CEECU-n-F
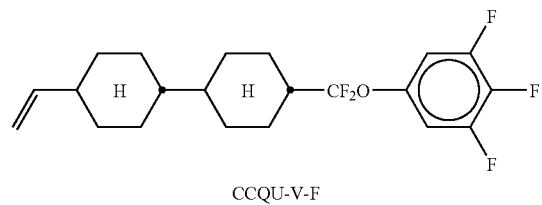
CCQU-V-F
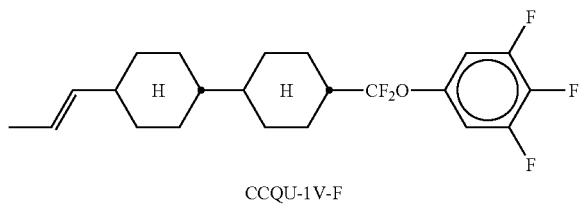
CCQU-1V-F
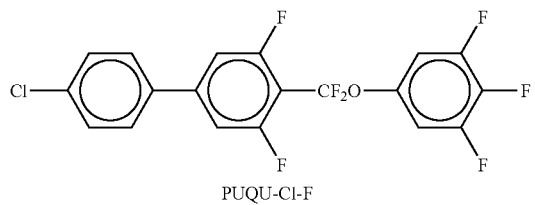
PUQU-Cl-F
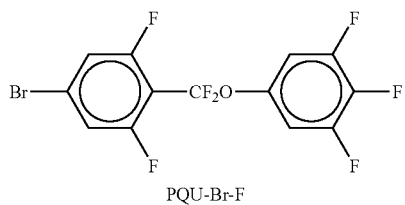
PQU-Br-F TABLE B-continued
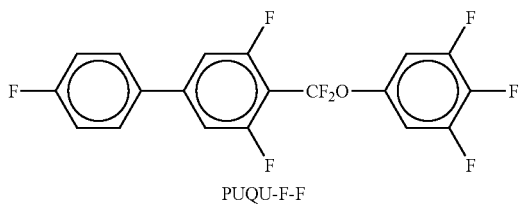
PUQU-F-F
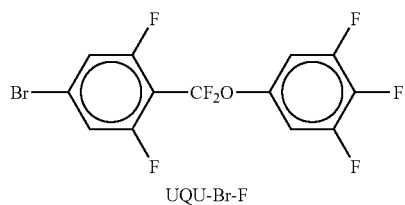
UQU-Br-F
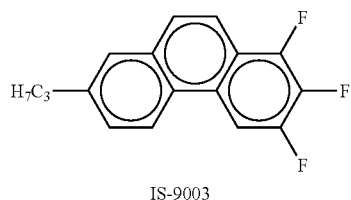
IS-9003
TABLE C
Table C shows possible dopants which are generally added to the mixtures according to the invention.
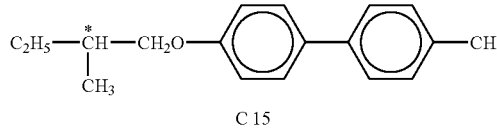
C 15
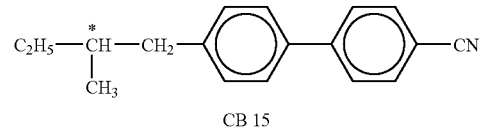
CB 15
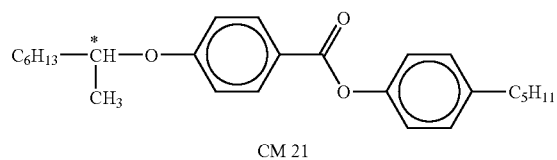
CM 21
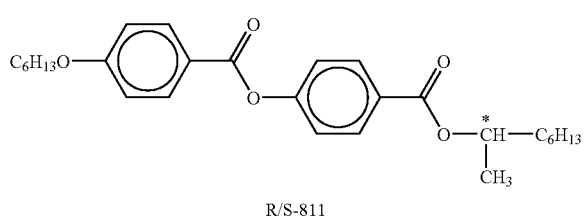
R/S-811
TABLE C-continued
Table C shows possible dopants which are generally added to the mixtures according to the invention.
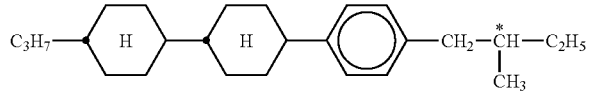
CM 44
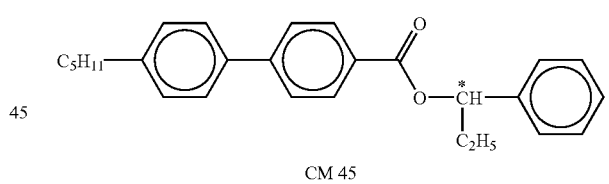
CM 45
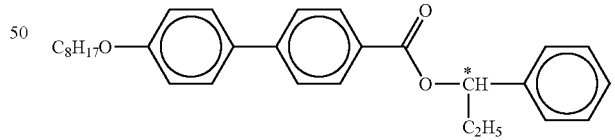
CM 47
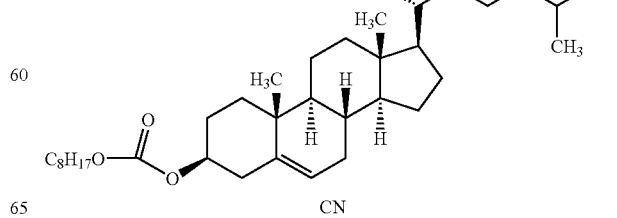
CN

TABLE C-continued
Table C shows possible dopants which are generally added to the mixtures according to the invention.
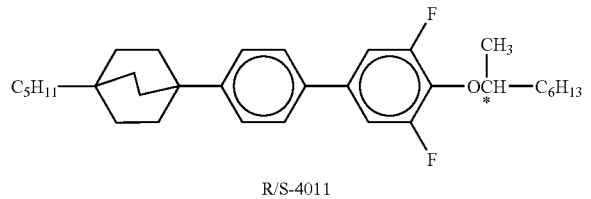
R/S-4011
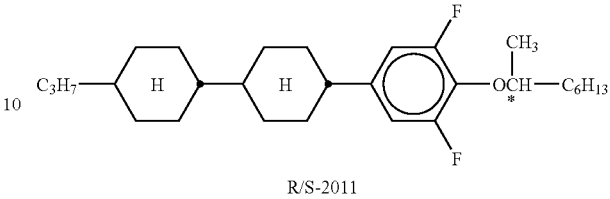
R/S-2011
TABLE D
Stabilisers which can be added, for example, to the mixtures according to the invention are mentioned below.
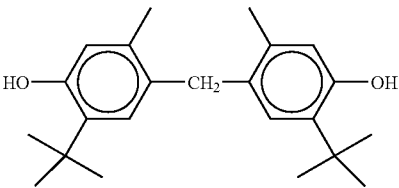
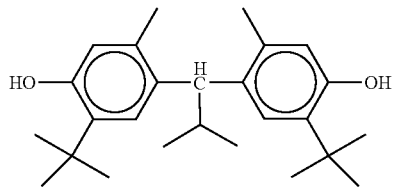
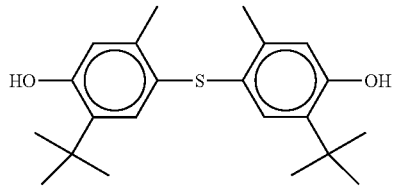
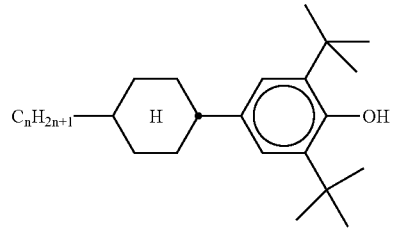
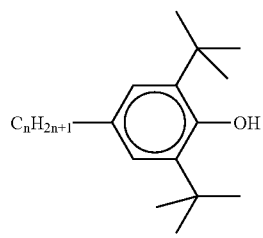

TABLE D-continued
Stabilisers which can be added, for example, to the mixtures according to the invention are mentioned below.
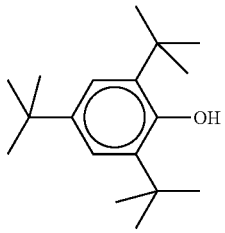
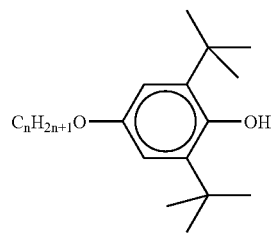
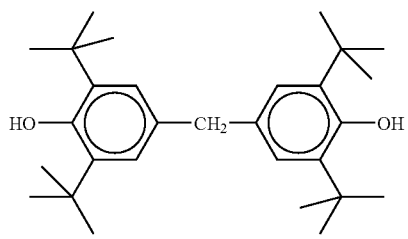
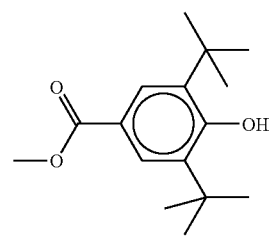
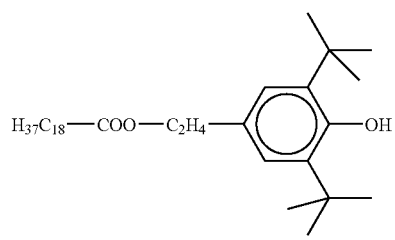
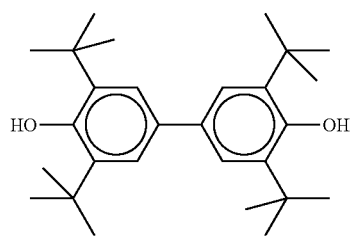

TABLE D-continued
Stabilisers which can be added, for example, to the mixtures according to the invention are mentioned below.
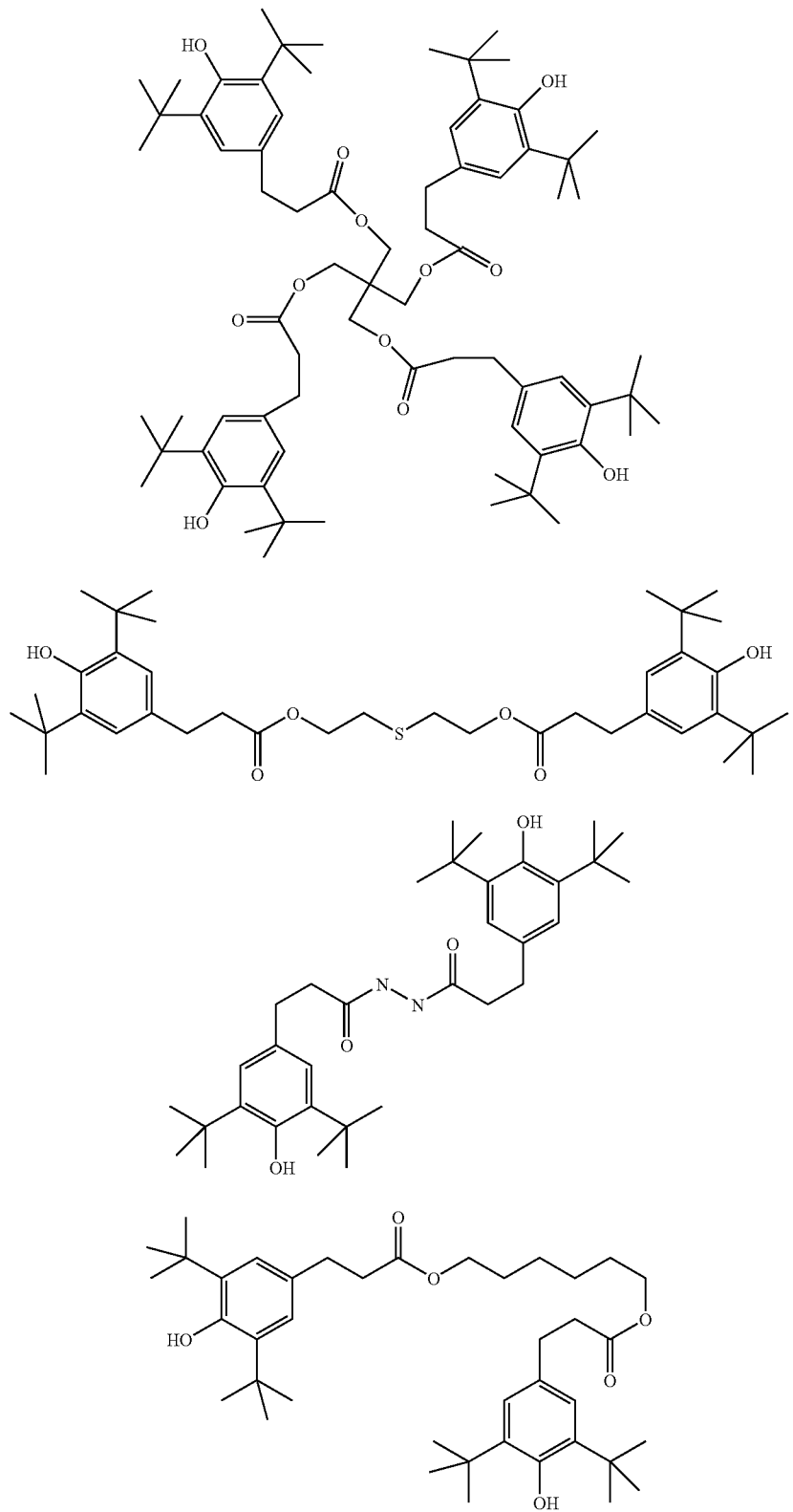

TABLE D-continued
Stabilisers which can be added, for example, to the mixtures according to the invention are mentioned below.
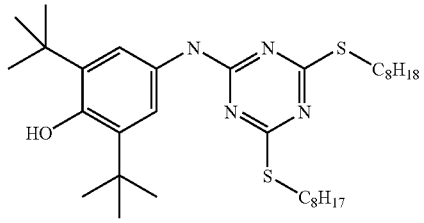
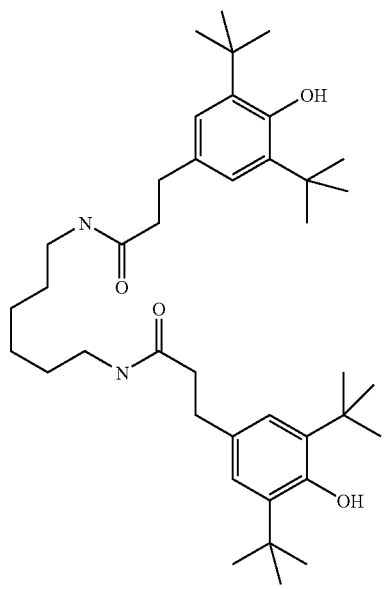
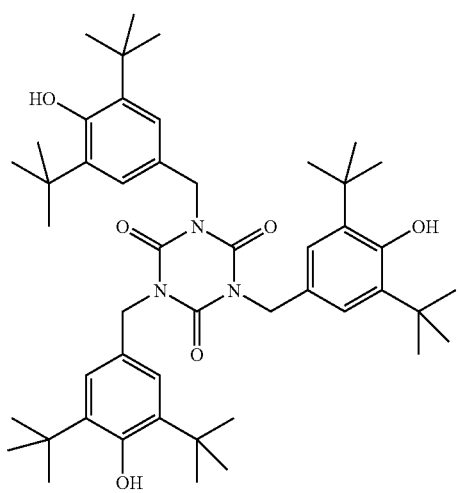

TABLE D-continued
Stabilisers which can be added, for example, to the mixtures according to the invention are mentioned below.
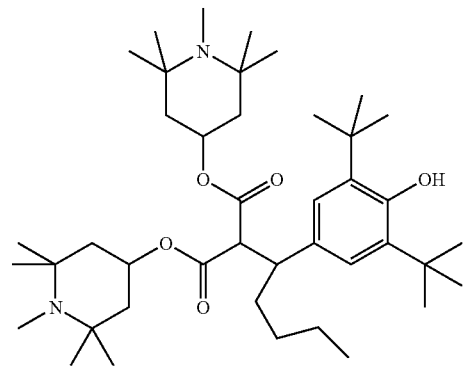
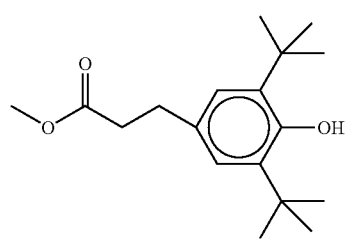
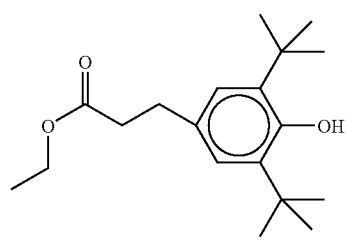
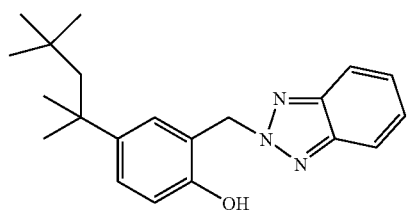
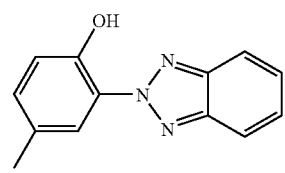
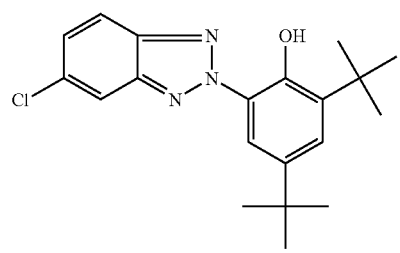

TABLE D-continued
Stabilisers which can be added, for example, to the mixtures according to the invention are mentioned below.
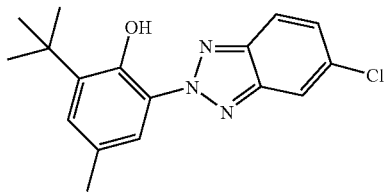
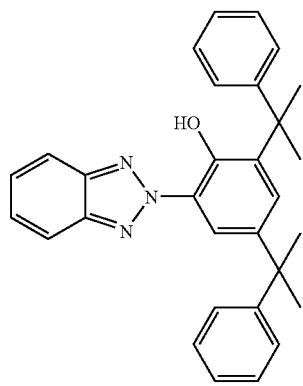
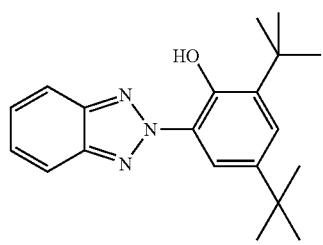
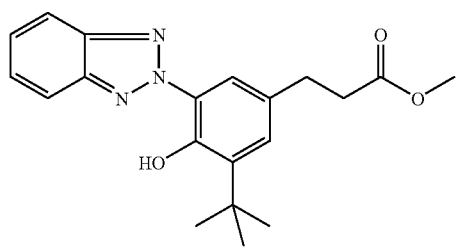
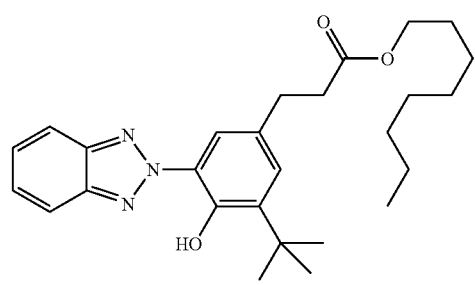

TABLE D-continued
Stabilisers which can be added, for example, to the mixtures according to the invention are mentioned below.
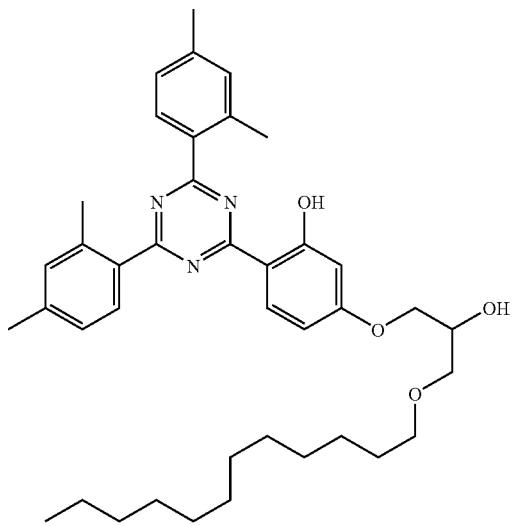
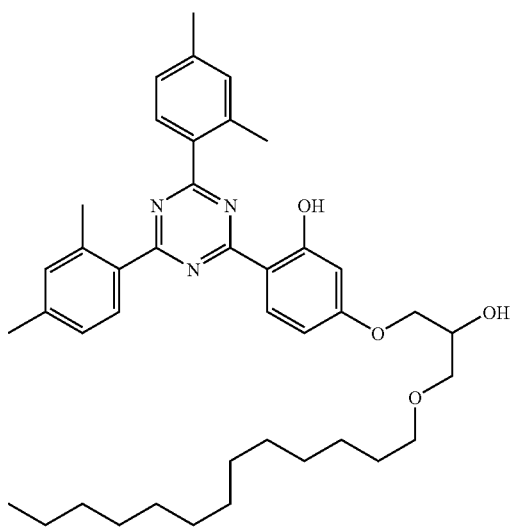
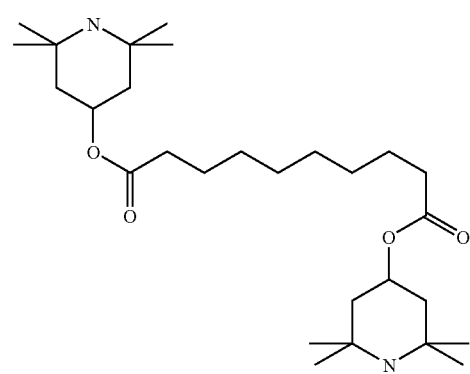

TABLE D-continued

Stabilisers which can be added, for example, to the mixtures according to the invention are mentioned below.

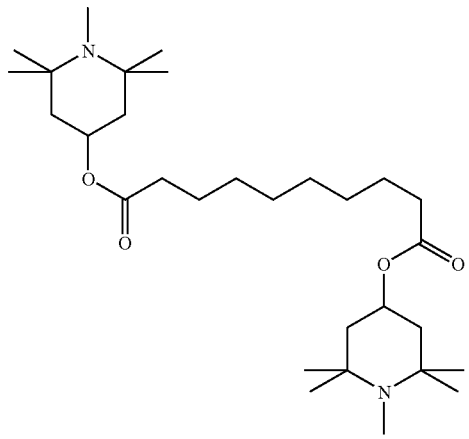

The following examples are intended to explain the invention without restricting it. Above and below, percentages are per cent by weight. All temperatures are given in degrees Celsius. m.p. denotes melting point, cl.p. clearing point. Furthermore, C=crystalline state, N=nematic phase, S=smectic phase and I=isotropic phase. The data between these symbols represent the transition temperatures. Δn denotes optical anisotropy (589 nm, 20° C.), Δε the dielectric anisotropy (1 kHz, 20° C.). The flow viscosity $v_{20}$ (mm²/sec) was determined at 20° C. The rotational viscosity $\gamma_1$ (mPa·s) was likewise determined at 20° C.

"Conventional work-up" means that water is added if necessary, the mixture is extracted with dichloromethane, diethyl ether, methyl tert-butyl ether or toluene, the phases are separated, the organic phase is dried and evaporated, and the product is purified by distillation under reduced pressure or crystallisation and/or chromatography. The following abbreviations are used:

| | |
|---|---|
| n-BuLi | 1.6 molar solution of n-butyllithium in n-hexane |
| DMAP | 4-(dimethylamino)pyridine |
| THF | tetrahydrofuran |
| DCC | N,N'-dicyclohexylcarbodiimide |
| LDA | lithium dimethylamide |

EXAMPLE 1

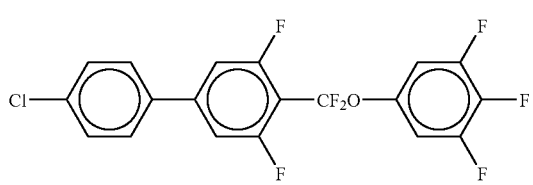

Step 1.1

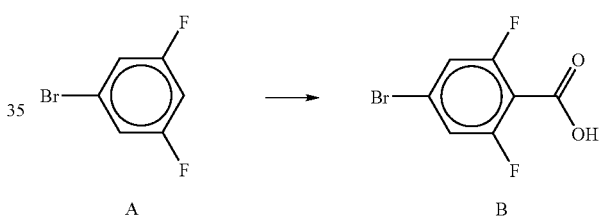

0.6 mol of A is dissolved in 750 ml of abs. THF and cooled to −70° C. After addition of 0.583 mol of lithium diisopropylamide, the mixture is stirred for 1 hour. $CO_2$ (1.2 mol) is subsequently passed into the reaction solution at such a rate that the temperature is ≦−60° C. When the reaction is complete, the reaction solution is stirred with water at −10° C. and subsequently acidified using HCl. Finally, the mixture is subjected to conventional work-up.

Step 1.2

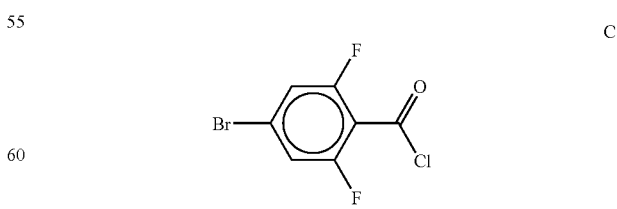

0.156 mol of thionyl chloride is added to 0.078 mol of B. The reaction mixture is refluxed for 2 hours. The excess thionyl chloride is stripped off under reduced pressure.

Step 1.3

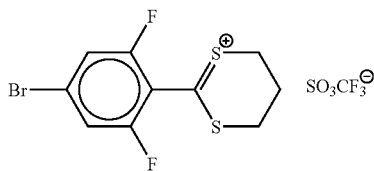

0.078 mol of C is added dropwise to 0.074 mol of 1,3-propanedithiol at 0° C. under $N_2$ with stirring. 0.112 mol of trifluoromethanesulfonic acid is subsequently added dropwise at −5° C., and the mixture is stirred for 2 hours. 0.297 mol of acetic anhydride is added dropwise at 3° C. After addition of 150 ml of abs. diethyl ether, the mixture is stirred for 0.5 hour. The crystals are cooled to −40° C., stirred for 1 hour, filtered off with suction, washed with diethyl ether and dried under reduced pressure.

Step 1.4

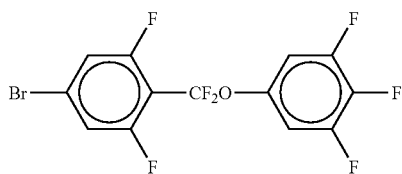

A mixture of 7.9 ml of triethylamine and 7.8 g of 3,4,5-trifluorophenol in 70 ml of dichloromethane is added dropwise at −70° C. to 0.035 mol of D dissolved in 200 ml of dichloromethane. The mixture is stirred at −70° C. for 1 hour, 0.175 mol of triethylamine hydrofluoride is added dropwise to the reaction mixture, the mixture is stirred for a further 0.5 hour, and a solution of 9 ml of bromine in 80 ml of dichloromethane is added dropwise at −70° C. The reaction mixture is stirred at −70° C. for a further 1.5 hours and allowed to warm to 0° C., and 210 ml of water and 90 ml of 32% sodium hydroxide solution are added. When the neutralisation is complete, the organic phase is subjected to conventional work-up.

Step 1.5

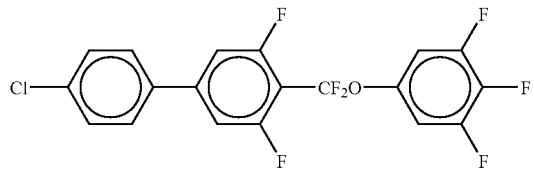

0.015 ml of sodium metaborate octahydrate is initially introduced in 24 ml of $H_2O$, 0.380 mol of bis(triphenyl)phosphinepalladium, 0.380 mol of hydrazinium hydroxide and 10 ml of THF are added, and the mixture is stirred for 5 minutes. 0.019 mol of 4-chlorophenylboronic acid in 38 ml of THF is added to the reaction mixture, which is warmed to 65° C. and refluxed overnight. The reaction mixture is allowed to cool to room temperature, water and methyl tert-butyl ether are added, and the mixture is subjected to conventional work-up.

C 71 I; Δn=0.1271; Δε=9.9; $γ_1$=68

EXAMPLE 2

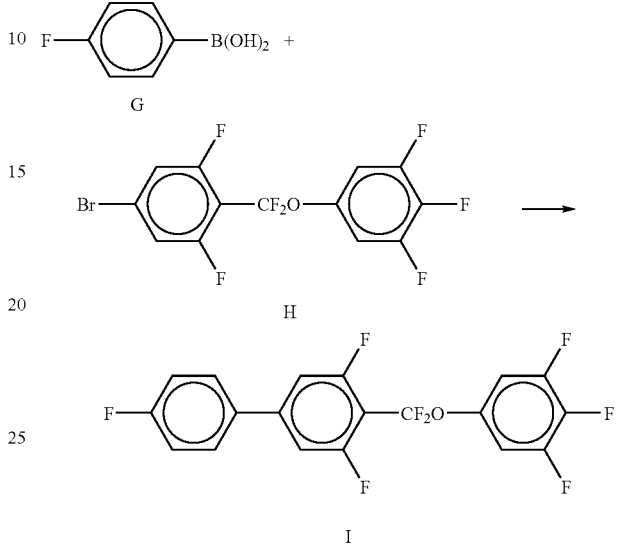

0.2 mmol of bis(triphenylphosphine)palladium, 0.01 mol of H and 6 ml of abs. THF are added to 7.5 mol of sodium metaborate octahydrate in 12 ml of $H_2O$, and the mixture is stirred for 5 minutes. After 0.01 mol of G in 18 ml of abs. THF has been added, the mixture is refluxed overnight. The reaction mixture is allowed to cool to room temperature, methyl tert-butyl ether is added, and the mixture is subjected to conventional work-up. C 68 I; Δn=0.1020; Δε=10.6; γ=71

EXAMPLE 3

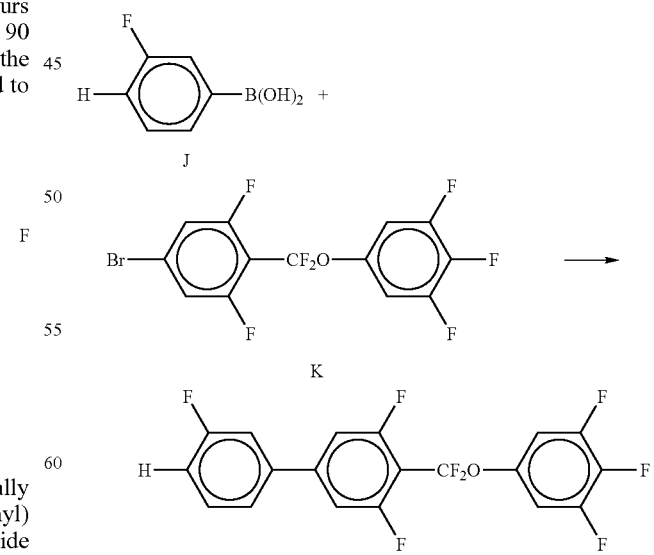

0.2 mmol of bis(triphenylphosphine)palladium, 0.01 mol of K and 6 ml of abs. THF are added to 7.5 mol of sodium metaborate octahydrate in 12 ml of H$_2$O, and the mixture is stirred for 5 minutes. After 0.01 mol of J in 18 ml of abs. THF has been added, the mixture is refluxed overnight. The reaction mixture is allowed to cool to room temperature, methyl tert-butyl ether is added, and the mixture is subjected to conventional work-up.

MIXTURE EXAMPLES

EXAMPLE M1

| | | | |
|---|---|---|---|
| BCH-3F.F | 10.80% | Clearing point [° C.]: | 81.9 |
| BCH-5F.F | 9.00% | Δn [589 nm, 20° C.]: | 0.100 |
| ECCP-30CF$_3$ | 4.50% | Δε [1 kHz, 20° C.]: | 5.7 |
| ECCP-50CF$_3$ | 4.50% | γ$_1$ [mPa · s]: | 125 |
| CBC-33F | 1.80% | | |
| CBC-53F | 1.80% | | |
| CBC-55F | 1.80% | | |
| PCH-6F | 7.20% | | |
| PCH-7F | 5.40% | | |
| CCP-20CF$_3$ | 7.20% | | |
| CCP-30CF$_3$ | 10.80% | | |
| CCP-40CF$_3$ | 6.30% | | |
| CCP-50CF$_3$ | 9.90% | | |
| PCH-5F | 9.00% | | |
| PUQU-Cl—F | 10.00% | | |

EXAMPLE M2

| | | | |
|---|---|---|---|
| BCH-3F.F | 10.80% | Clearing point [° C.]: | 79.4 |
| BCH-5F.F | 9.00% | Δn [589 nm, 20° C.]: | 0.0975 |
| ECCP-30CF$_3$ | 4.50% | Δε [1 kHz, 20° C.]: | 5.8 |
| ECCP-50CF$_3$ | 4.50% | ν$_{20}$ [mm$^2$ · s$^{-1}$]: | 14 |
| CBC-33F | 1.80% | γ$_1$ [mPa · s]: | 117 |
| CBC-53F | 1.80% | | |
| CBC-55F | 1.80% | | |
| PCH-6F | 7.20% | | |
| PCH-7F | 5.40% | | |
| CCP-20CF$_3$ | 7.20% | | |
| CCP-30CF$_3$ | 10.80% | | |
| CCP-40CF$_3$ | 6.30% | | |
| CCP-50CF$_3$ | 9.90% | | |
| PCH-5F | 9.00% | | |
| PUQU-F—F | 10.00% | | |

EXAMPLE M3

| | | | |
|---|---|---|---|
| BCH-3F.F | 10.80% | Clearing point [° C.]: | 72.3 |
| BCH-5F.F | 9.00% | Δn [589 nm, 20° C.]: | 0.0913 |
| ECCP-30CF$_3$ | 4.50% | Δε [1 kHz, 20° C.]: | 5.4 |
| ECCP-50CF$_3$ | 4.50% | | |
| CBC-33F | 1.80% | | |
| CBC-53F | 1.80% | | |
| CBC-55F | 1.80% | | |
| PCH-6F | 7.20% | | |
| PCH-7F | 5.40% | | |
| CCP-20CF$_3$ | 7.20% | | |
| CCP-30CF$_3$ | 10.80% | | |
| CCP-40CF$_3$ | 6.30% | | |
| CCP-50CF$_3$ | 9.90% | | |
| PCH-5F | 9.00% | | |
| UQU-Br—F | 10.00% | | |

EXAMPLE M4

| | | | |
|---|---|---|---|
| CCP-2F.F.F | 10.00% | S → N [° C.]: | <-20 |
| CCP-3F.F.F | 10.00% | Clearing point [° C.]: | 82.0 |
| CCP-20CF$_3$.F | 6.00% | Δn [589 nm, 20° C.]: | 0.0950 |
| CCP-30CF$_3$.F | 12.00% | γ$_1$ [mPa · s, 20° C.]: | 163 |
| CCP-20CF$_3$ | 6.0% | V$_{10,0,20}$ [V]: | 1.22 |
| CCP-30CF$_3$ | 8.0% | | |
| CCP-40CF$_3$ | 7.00% | | |
| CCP-50CF$_3$ | 8.00% | | |
| PUQU-F—F | 8.00% | | |
| CGU-2-F | 10.00% | | |
| CGU-3-F | 11.00% | | |
| CCGU-3-F | 4.00% | | |

EXAMPLE M5

| | | | |
|---|---|---|---|
| CCP-1F.F.F | 3.00% | S → N [° C.]: | <-40 |
| CCP-2F.F.F | 10.00% | Clearing point [° C.]: | 83.0 |
| CCP-3F.F.F | 4.00% | Δn [589 nm, 20° C.]: | 0.0937 |
| CCP-20CF$_3$.F | 12.00% | γ$_1$ [mPa · s, 20° C.]: | 165 |
| CCP-30CF$_3$.F | 12.00% | V$_{10,0,20}$ [V]: | 1.26 |
| CCP-20CF$_3$ | 8.00% | | |
| CCP-30CF$_3$ | 8.00% | | |
| CCP-40CF$_3$ | 5.00% | | |
| CCP-50CF$_3$ | 8.00% | | |
| PUQU-F—F | 7.00% | | |
| CGU-2-F | 11.00% | | |
| CGU-3-F | 7.00% | | |
| CCGU-3-F | 5.00% | | |

EXAMPLE M6

| | |
|---|---|
| PUQU-F—F | 8.00% |
| CCP-1F.F.F | 8.50% |
| CCZU-2-F | 3.00% |
| CCZU-3-F | 13.00% |
| CCP-30CF$_3$ | 8.00% |
| CCP-40CF$_3$ | 4.00% |
| CGZP-2-OT | 6.00% |
| CGZP-3-OT | 1.80% |
| PGU-2-F | 2.70% |
| CC-5-V | 10.00% |
| CC-3-V1 | 12.00% |
| CCH-35 | 5.00% |
| CC-3-V | 18.00% |

EXAMPLE M7

| | | | |
|---|---|---|---|
| PCH-5F | 3.20% | Clearing point [° C.]: | 90.0 |
| CCP-20CF$_2$.F.F | 17.04% | Δε [1 kHz, 20° C.]: | 8.6 |
| CCP-30CF$_2$.F.F | 16.00% | | |
| CCP-50CF$_2$.F.F | 17.04% | | |
| CUP-2F.F | 5.36% | | |
| CUP-3F.F | 5.36% | | |
| CBC-33F | 5.36% | | |
| CBC-53F | 5.36% | | |
| CBC-55F | 5.28% | | |
| PUQU-F—F | 20.00% | | |

EXAMPLE M8

| | | | |
|---|---|---|---|
| CCP-2F.F.F | 10.00% | Clearing point [° C.]: | 85.0 |
| CCP-3F.F.F | 4.00% | Δn [589 nm, 20° C.]: | 0.0912 |
| CCP-20CF$_3$.F | 12.00% | γ$_1$ [mPa · s, 20° C.): | 152 |
| CCP-30CF$_3$.F | 12.00% | V$_{10,0,20}$ [V]: | 1.31 |
| CCP-3F.F | 12.00% | | |
| CCP-30CF$_3$ | 4.00% | | |
| CCP-40CF$_3$ | 5.00% | | |
| CCP-50CF$_3$ | 8.00% | | |
| PUQU-F—F | 7.00% | | |
| CGU-2-F | 11.00% | | |
| CGU-3-F | 7.00% | | |
| PCH-7F | 5.00% | | |
| CBC-33 | 3.00% | | |

EXAMPLE M9

| | | | |
|---|---|---|---|
| CCP-2F.F.F | 10.00% | Clearing point [° C.]: | 99.0 |
| CCP-3F.F.F | 4.00% | Δn [589 nm, 20° C.]: | 0.0979 |
| CCP-20CF$_3$.F | 12.00% | γ$_1$ [mPa · s, 20° C.): | 186 |
| CCP-30CF$_3$.F | 12.00% | V$_{10,0,20}$ [V]: | 1.32 |
| CCP-3F.F | 12.00% | | |
| CCP-30CF$_3$ | 4.00% | | |
| CCP-40CF$_3$ | 5.00% | | |
| CCP-50CF$_3$ | 5.00% | | |
| PUQU-Cl—F | 7.00% | | |
| CGU-2-F | 11.00% | | |
| PCH-7F | 5.00% | | |
| CBC-33 | 6.00% | | |
| CCGU-3-F | 7.00% | | |

EXAMPLE M10

| | | | |
|---|---|---|---|
| CCP-2F.F.F | 10.00% | Clearing point [° C.]: | 98.0 |
| CCP-3F.F.F | 4.00% | Δn [589 nm, 20° C.]: | 0.0975 |
| CCP-20CF$_3$.F | 12.00% | γ$_1$ [mPa · s, 20° C.): | 184 |
| CCP-30CF$_3$.F | 12.00% | V$_{10,0,20}$ [V]: | 1.29 |
| CCQU-3-F | 10.00% | | |
| CCP-30CF$_3$ | 4.00% | | |
| CCP-40CF$_3$ | 5.00% | | |
| CCP-50CF$_3$ | 5.00% | | |
| PUQU-Cl—F | 7.00% | | |
| CGU-2-F | 11.00% | | |
| PCH-7F | 5.00% | | |
| CBC-33 | 6.00% | | |
| CCGU-3-F | 9.00% | | |

EXAMPLE M11

| | | | |
|---|---|---|---|
| CCQU-1-F | 10.00% | Clearing point [° C.]: | 86.0 |
| CCQU-2-F | 4.00% | Δn [589 nm, 20° C.]: | 0.0928 |
| CCP-20CF$_3$.F | 12.00% | γ$_1$ [mPa · s, 20° C.): | 152 |
| CCP-30CF$_3$.F | 12.00% | V$_{10,0,20}$ [V]: | 1.34 |
| CCQU-3-F | 10.00% | | |
| CCP-30CF$_3$ | 4.00% | | |
| PUQU-F—F | 7.00% | | |
| CGU-2-F | 11.00% | | |
| PCH-7F | 5.00% | | |
| CBC-33 | 6.00% | | |
| CCGU-3-F | 9.00% | | |
| CC-3-V1 | 10.00% | | |

EXAMPLE M12

| | | | |
|---|---|---|---|
| IS-9003 | 10.00% | Clearing point [° C.]: | 85.0 |
| CCP-3F.F.F | 10.00% | Δn [589 nm, 20° C.]: | 0.1015 |
| CCP-20CF$_3$.F | 12.00% | γ$_1$ [mPa · s, 20° C.): | 145 |
| CCP-30CF$_3$.F | 12.00% | V$_{10,0,20}$ [V]: | 1.33 |
| CCP-30CF$_3$ | 4.00% | | |
| PUQU-F—F | 7.00% | | |
| CGU-2-F | 11.00% | | |
| PCH-7F | 5.00% | | |
| CBC-33 | 6.00% | | |
| CCGU-3-F | 9.00% | | |
| CC-3-V1 | 10.00% | | |
| CCOC-4-3 | 4.00% | | |

EXAMPLE M13

| | | | |
|---|---|---|---|
| IS-9003 | 10.00% | Clearing point [° C.]: | 71.0 |
| CCP-3F.F.F | 10.00% | Δn [589 nm, 20° C.]: | 0.0980 |
| CCP-20CF$_3$.F | 12.00% | γ$_1$ [mPa · s, 20° C.): | 125 |
| CCP-30CF$_3$.F | 12.00% | V$_{10,0,20}$ [V]: | 1.36 |
| CCP-30CF$_3$ | 4.00% | | |
| PUQU-Cl—F | 11.00% | | |
| CGU-2-F | 11.00% | | |
| CC-3-V | 6.00% | | |
| CCGU-3-F | 9.00% | | |
| CC-3-V1 | 10.00% | | |
| CCOC-4-3 | 5.00% | | |

The invention claimed is:

1. A liquid-crystalline compound of the formula I:

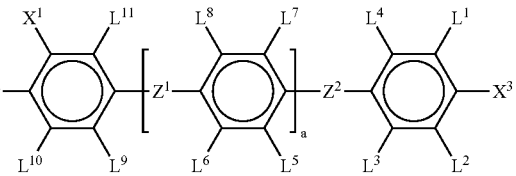

I in which

X$^1$ and X$^2$ are each, independently of one another, F, Cl, Br or I, or one of the radicals X$^1$ and X$^2$ is alternatively H, X$^3$ is F, Cl, CN, NCS, SF$_5$, or a halogenated alkyl, alkoxy, alkenyl or alkenyloxy radical having 1 to 5 carbon atoms, Z$^1$ and Z$^2$ are each, independently of one another, —CO—O—, —O—CO—, —CF$_2$O—, —OCF$_2$—, —CH$_2$O—, —OCH$_2$—, —CH$_2$CH$_2$—, —(CH$_2$)$_4$—, —C$_2$F$_4$—, —CH$_2$CF$_2$—, —CF$_2$CH$_2$—, —CF═CF—, —CH═CH—, —C≡C— or a single bond, with the proviso that at least one of the bridges Z$^1$ and Z$^2$ is —CF$_2$O— or —OCF$_2$—, a is 0, 1 or 2, and L$^1$ to L$^{11}$ are each, independently of one another, H or F, provided that the compound contains at least one of the following structures:

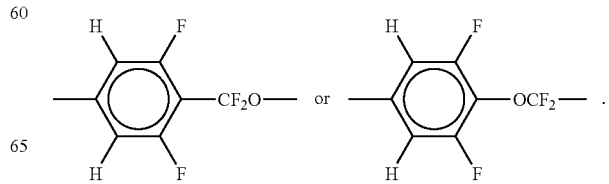

2. A liquid-crystalline compound according to claim 1, wherein $X^1$=F or Cl and $X^2$=H and $X^3$=F or $OCF_3$.

3. A liquid-crystalline compound according to claim 1, wherein a=1.

4. A liquid-crystalline compound according to claim 1, wherein $L^1$ is fluorine and $L^2$ is fluorine or hydrogen.

5. A liquid-crystalline compound according to claim 4, wherein $L^2$ and $L^3$ are fluorine.

6. A liquid-crystalline compound of claim 1 which is of one of the formulae I1 to I120:

I1
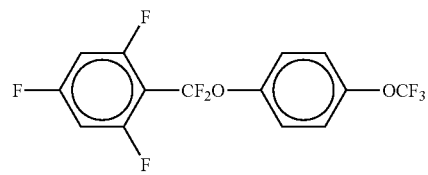

I2
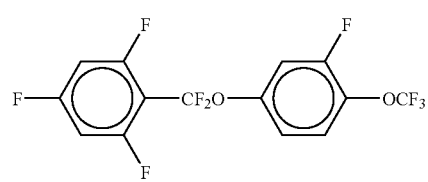

I3
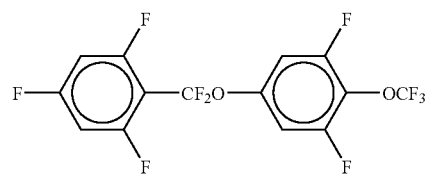

I4
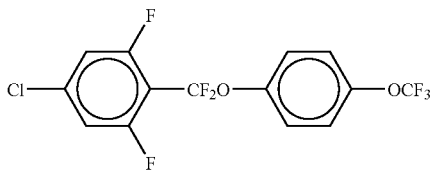

I5
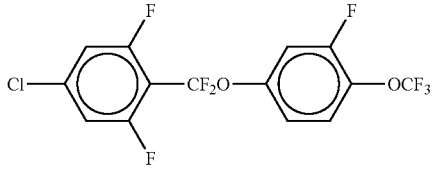

I6
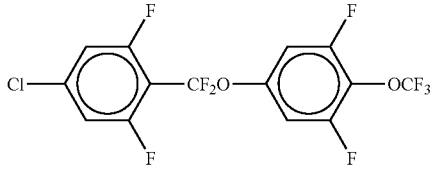

I7
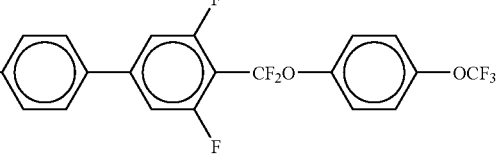

-continued

I8
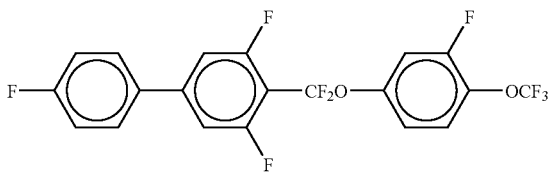

I9
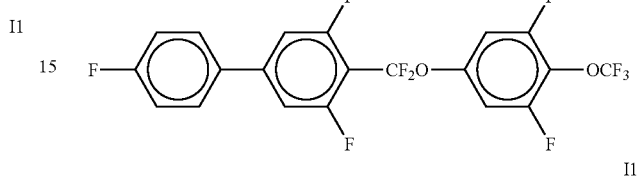

I10
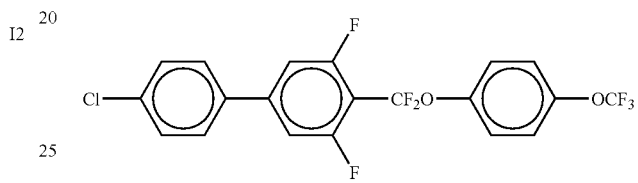

I11
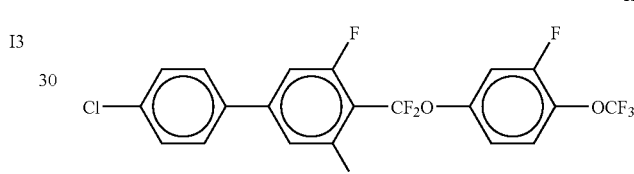

I12
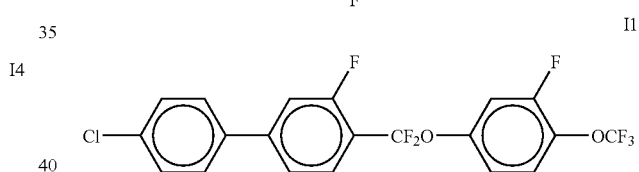

I13
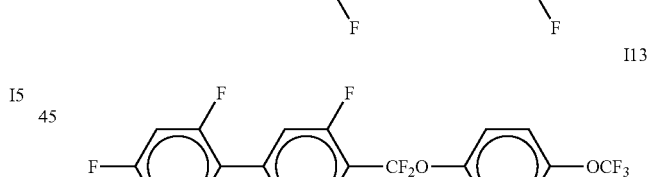

I14
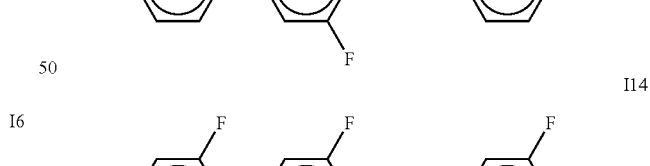

I15
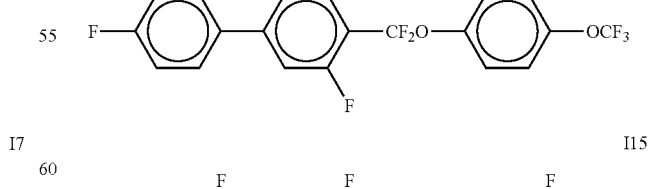

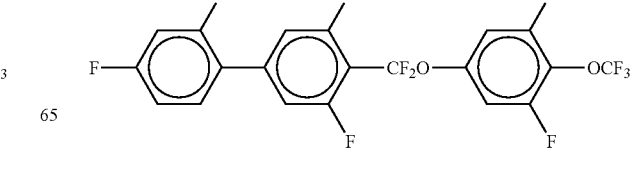

-continued
I16
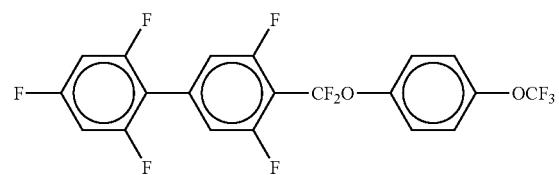
I17
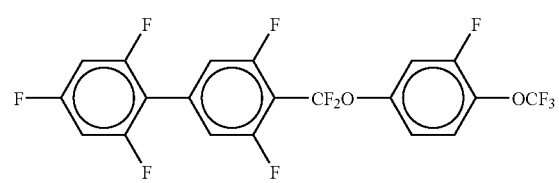
I18
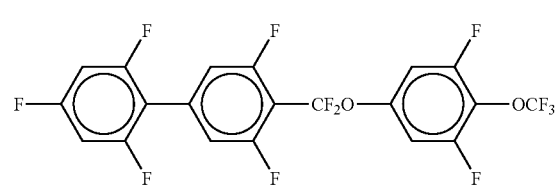
I19
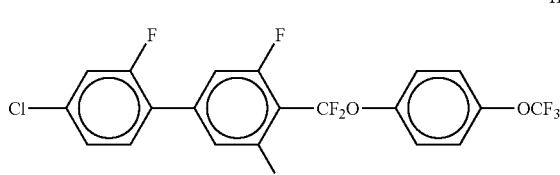
I20
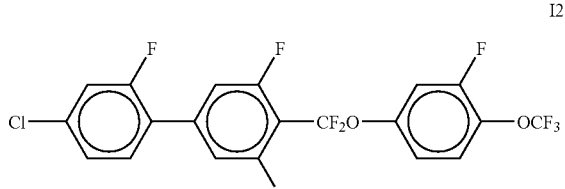
I21
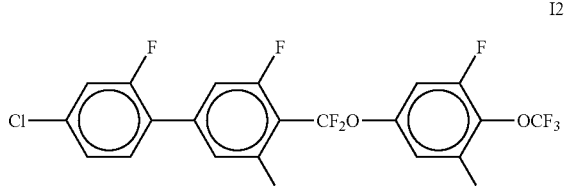
I22
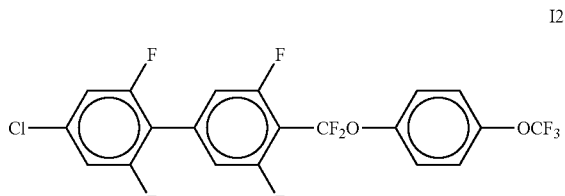
I23
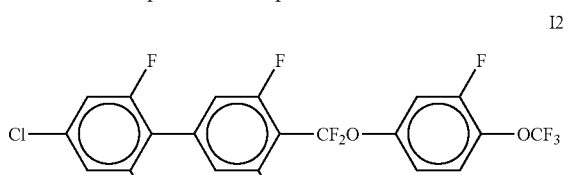
-continued
I24
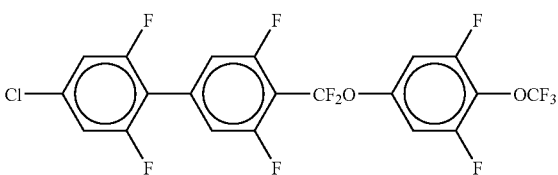
I25
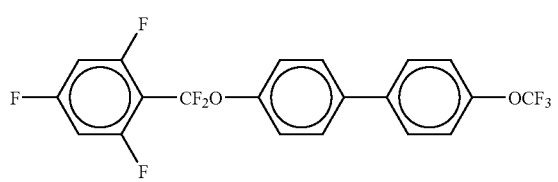
I26
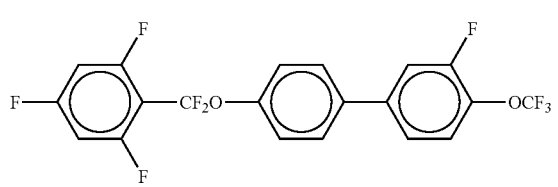
I27
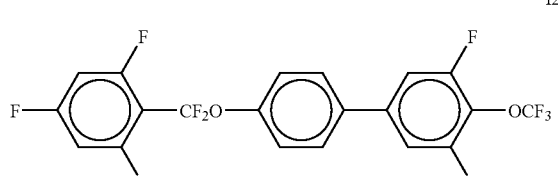
I28
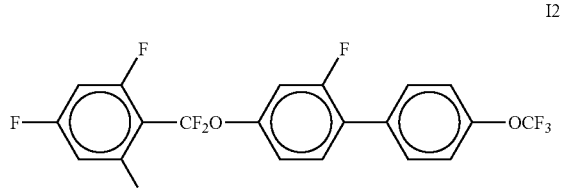
I29
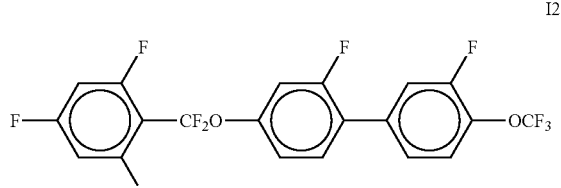
I30
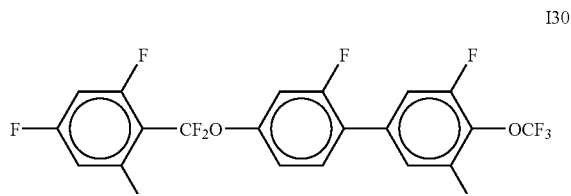
I31
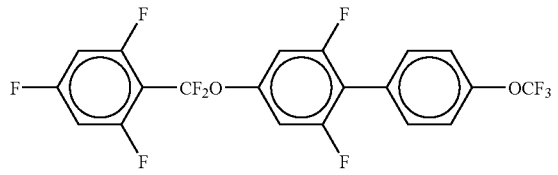

I32 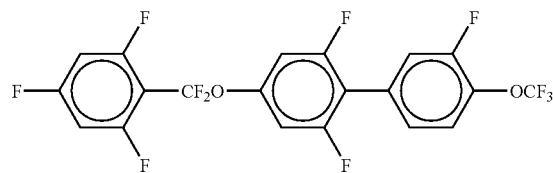
I33 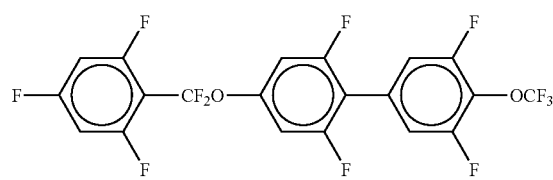
I34 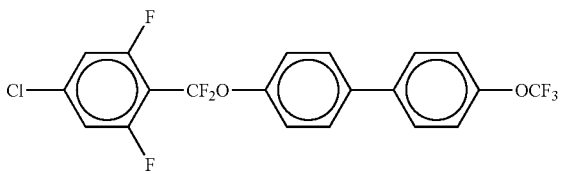
I35 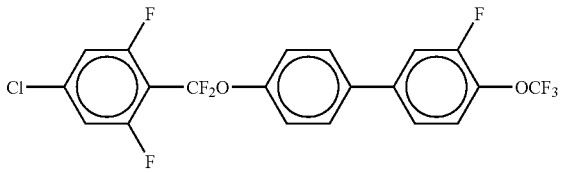
I36 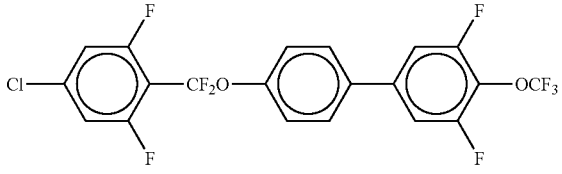
I37 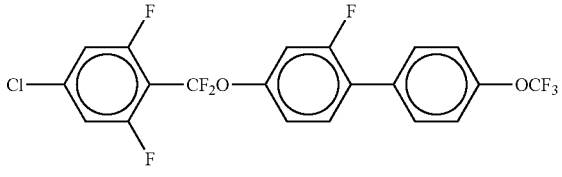
I38 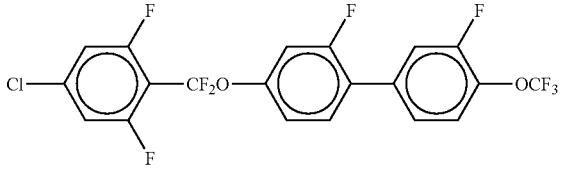
I39 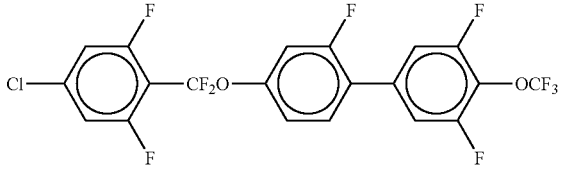
I40 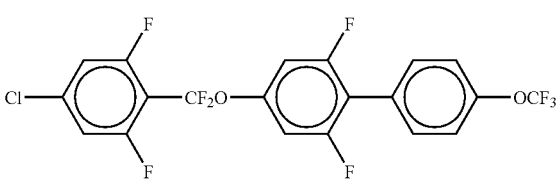
I41 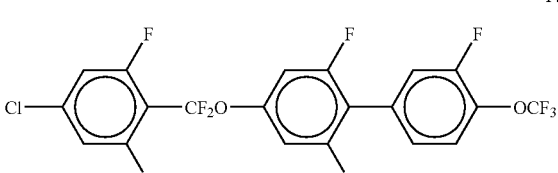
I42 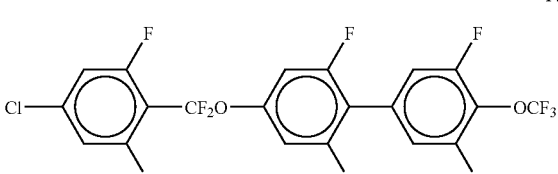
I43 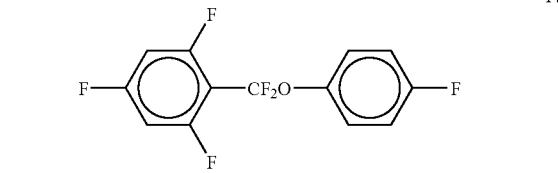
I44 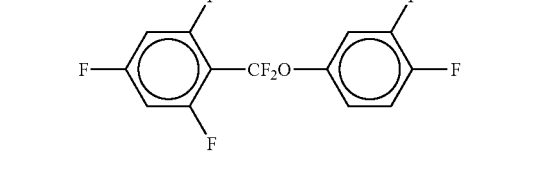
I45 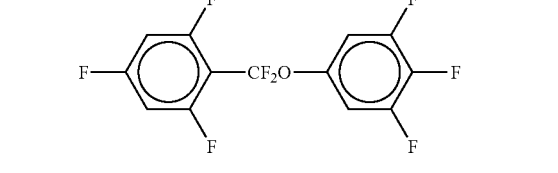
I46 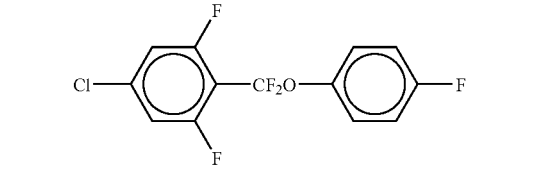
I47 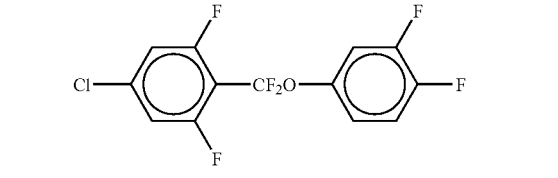

-continued

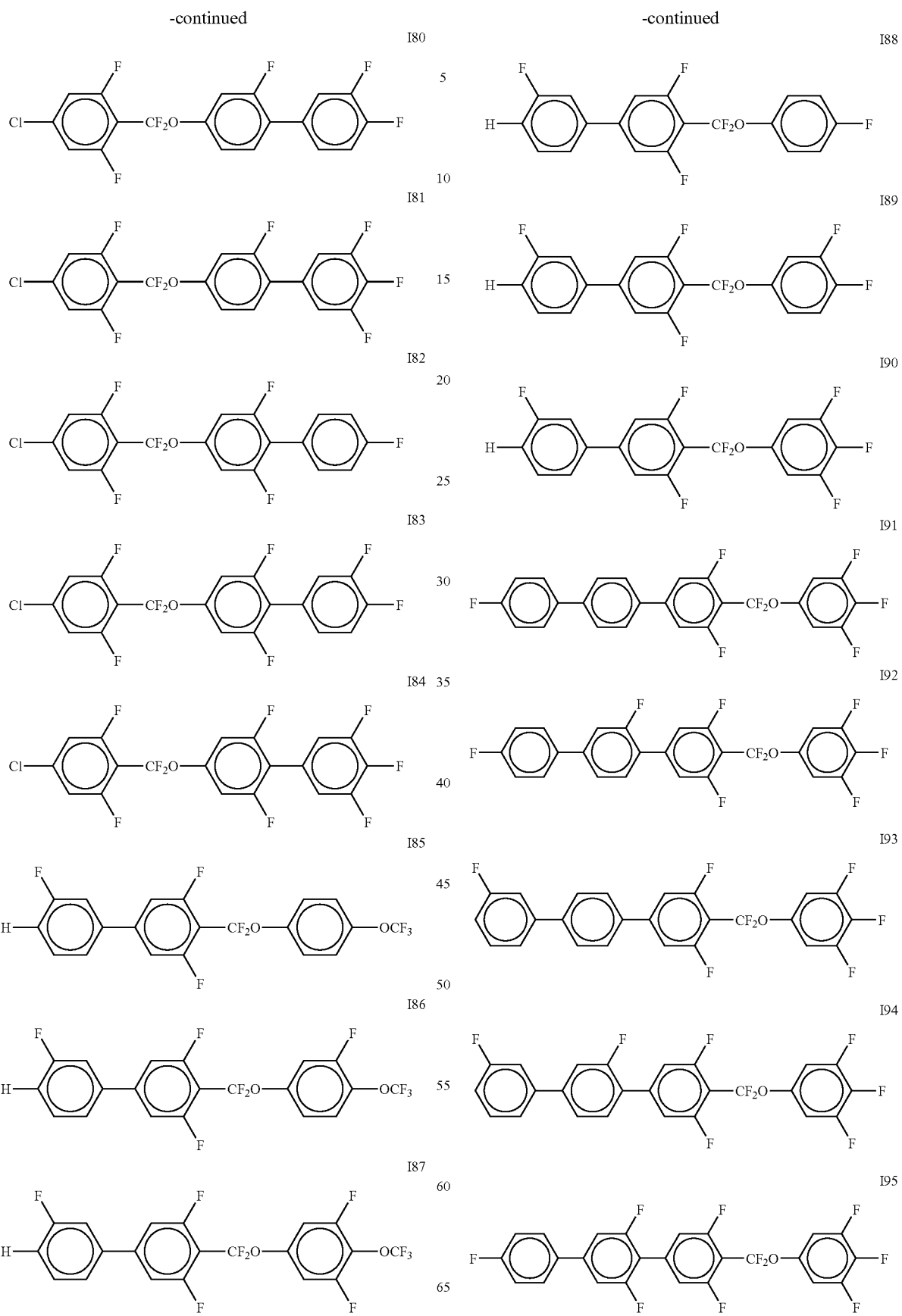

-continued
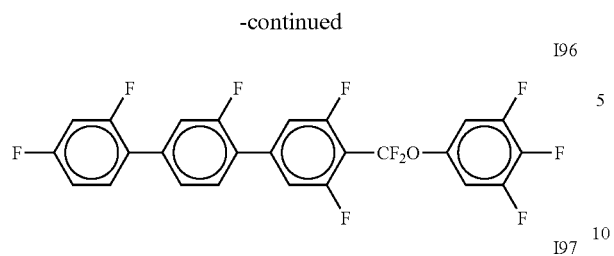 I96
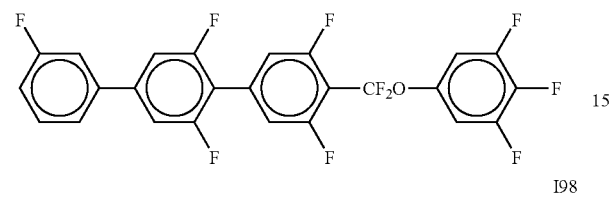 I97
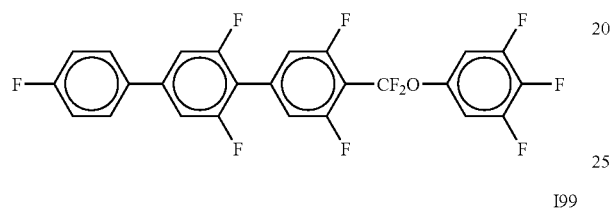 I98
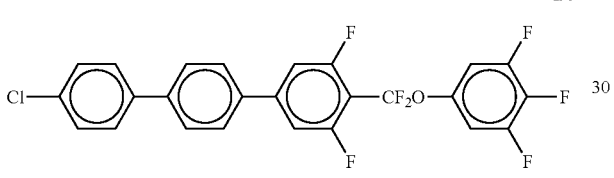 I99
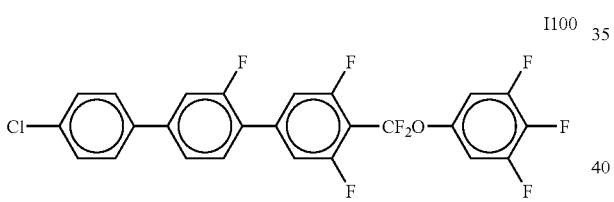 I100
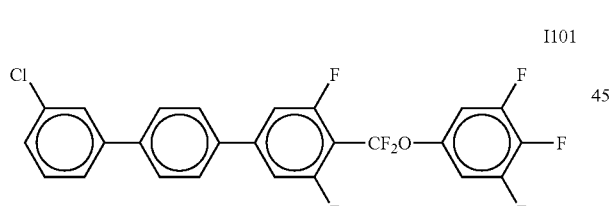 I101
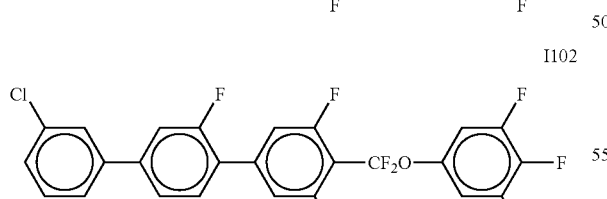 I102
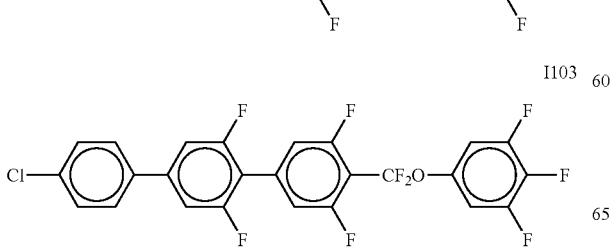 I103
-continued
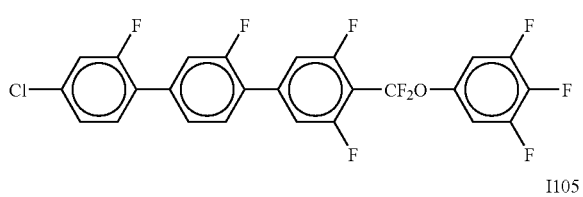 I104
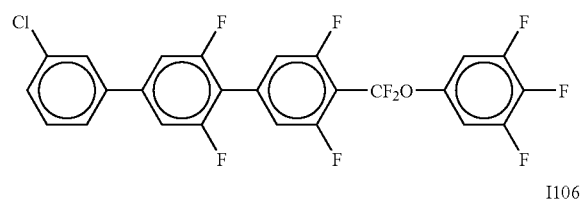 I105
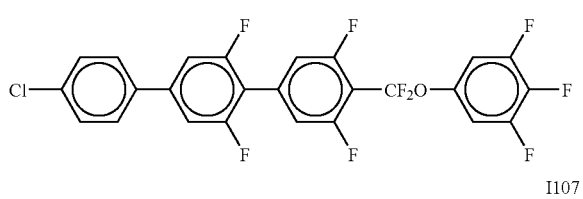 I106
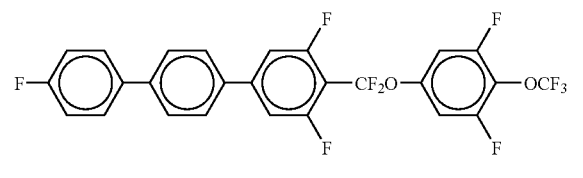 I107
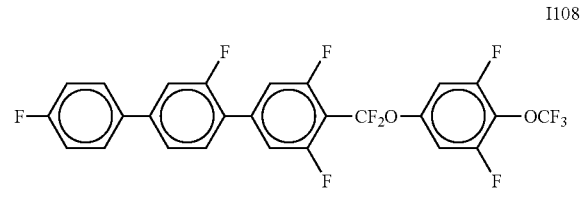 I108
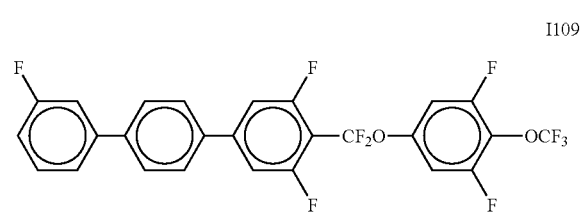 I109
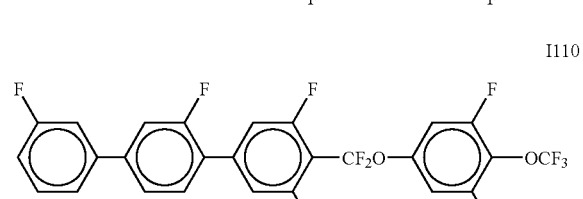 I110
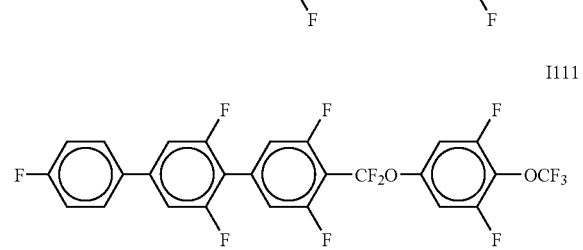 I111

7. Liquid-crystalline medium comprising at least two mesogenic compounds which comprises at least one compound of the formula I according to claim 1.

8. Liquid-crystalline medium according to claim 7, which further comprises one or more compounds selected from the group consisting of those of formulae II to IX:

-continued

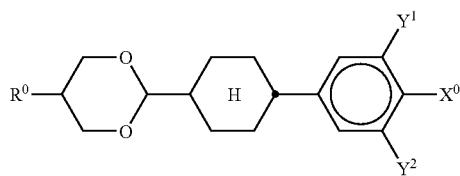

IX in which

| | |
|---|---|
| $R^0$ | is H, n-alkyl, oxaalkyl, fluoroalkyl, alkenyloxy or alkenyl, each having up to 9 carbon atoms, |
| $X^0$ | is F, Cl, halogenated alkyl, halogenated alkenyl, halogenated alkenyloxy or halogenated alkoxy having up to 7 carbon atoms, |
| $Z^0$ | is —CH=CH—, —C$_2$H$_4$—, —(CH$_2$)$_4$—, —C$_2$F$_4$—, —CH$_2$O—, —OCH$_2$—, —CF=CF—, —CF$_2$O—, —OCF$_2$— or —COO—, |
| $Y^1$, $Y^2$, $Y^3$ and $Y^4$ | are each, independently of one another, H or F, and |
| r | is 0 or 1. |

9. Electro-optical liquid-crystal display containing a liquid-crystalline medium according to claim 7.

10. Electro-optical liquid crystal display contain a liquid-crystalline medium according to claim 8.

11. A crop-protection agent composition comprising a compound according to claim 1.

12. A pharmaceutical composition comprising a compound according claim 1.

13. A liquid-crystalline compound according to claim 2, wherein a=1.

14. A liquid-crystalline compound according to claim 2, wherein $L^1$ is fluorine and $L^2$ is fluorine or hydrogen.

15. A liquid-crystalline compound according to claim 13, wherein $L^1$ is fluorine and $L^2$ is fluorine or hydrogen.

16. A display according to claim 9, wherein the display is a STN or MLC display.

17. A liquid-crystalline medium according to claim 7, wherein the medium retains the nematic phase down to at least −20° C., has a clearing point above 80° C, has a dielectric anisotropy value, Δε, of ≧4 and has a TN threshold below 1.5 V.

* * * * *